United States Patent
Switkes et al.

(10) Patent No.: US 10,216,195 B2
(45) Date of Patent: *Feb. 26, 2019

(54) APPLICATIONS FOR USING MASS ESTIMATIONS FOR VEHICLES

(71) Applicant: Peloton Technology, Inc., Mountain View, CA (US)

(72) Inventors: Joshua Philip Switkes, Mountain View, CA (US); Stephen M. Erlien, Mountain View, CA (US); Austin B. Schuh, Los Altos, CA (US)

(73) Assignee: Peloton Technology, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/988,905

(22) Filed: May 24, 2018

(65) Prior Publication Data

US 2018/0267559 A1    Sep. 20, 2018

Related U.S. Application Data

(60) Continuation of application No. 15/908,677, filed on Feb. 28, 2018, which is a continuation-in-part of
(Continued)

(51) Int. Cl.
*G05D 1/00* (2006.01)
*G05D 1/02* (2006.01)
(Continued)

(52) U.S. Cl.
CPC ....... *G05D 1/0293* (2013.01); *B60R 16/0231* (2013.01); *B60W 10/06* (2013.01);
(Continued)

(58) Field of Classification Search
None
See application file for complete search history.

(56) References Cited

U.S. PATENT DOCUMENTS

| 3,725,921 A | 4/1973 | Weidman et al. |
| 4,370,718 A | 1/1983 | Chasek |

(Continued)

FOREIGN PATENT DOCUMENTS

| DE | 102011002275 | 10/2012 |
| EP | 0 982 173 | 3/2000 |

(Continued)

OTHER PUBLICATIONS

Alam, An Experimental Study on the Fuel Reduction Potential of Heavy Duty Vehicle Platooning, 2010 13th International IEEE Annual Conference on Intelligent Transportation Systems, Sep. 19-22, 2010 (Year: 2010).*

(Continued)

*Primary Examiner* — Nicholas K Wiltey
(74) *Attorney, Agent, or Firm* — Beyer Law Group LLP

(57) ABSTRACT

Various applications for use of mass estimations of a vehicle, including to control operation of the vehicle, sharing the mass estimation with other vehicles and/or a Network Operations Center (NOC), organizing vehicles operating in a platoon and/or partially controlling the operation of one or more vehicles operating in a platoon based on the relative mass estimations between the platooning vehicles. When vehicles are operating in a platoon, the relative mass between a lead and a following vehicle may be used to scale torque and/or brake commands generated by the lead vehicle and sent to the following vehicle.

29 Claims, 15 Drawing Sheets

Related U.S. Application Data application No. PCT/US2017/047771, filed on Aug. 21, 2017, which is a continuation-in-part of application No. 15/607,316, filed on May 26, 2017, which is a continuation-in-part of application No. 15/589,124, filed on May 8, 2017, which is a continuation of application No. 14/855,044, filed on Sep. 15, 2015, now Pat. No. 9,645,579, which is a continuation-in-part of application No. 14/292,583, filed as application No. PCT/US2014/030770 on Mar. 17, 2014, now Pat. No. 9,665,102, which is a division of application No. 13/542,622, filed on Jul. 5, 2012, now Pat. No. 8,744,666, and a division of application No. 13/542,627, filed on Jul. 5, 2012, now Pat. No. 9,582,006.

(60) Provisional application No. 62/377,970, filed on Aug. 22, 2016, provisional application No. 61/792,304, filed on Mar. 15, 2013, provisional application No. 61/505,076, filed on Jul. 6, 2011.

(51) Int. Cl.

| | | |
|---|---|---|
| *G07C 5/00* | (2006.01) | |
| *G08G 1/00* | (2006.01) | |
| *H04W 4/46* | (2018.01) | |
| *B60W 10/06* | (2006.01) | |
| *B60W 10/10* | (2012.01) | |
| *B60W 10/20* | (2006.01) | |
| *B60W 10/22* | (2006.01) | |
| *B60W 30/14* | (2006.01) | |
| *B60W 30/18* | (2012.01) | |
| *B60W 40/13* | (2012.01) | |
| *G01G 19/02* | (2006.01) | |
| *G01G 19/08* | (2006.01) | |
| *G01S 19/13* | (2010.01) | |
| *H04L 29/08* | (2006.01) | |
| *H04W 84/00* | (2009.01) | |
| *B60R 16/023* | (2006.01) | |
| *B60W 10/184* | (2012.01) | |
| *B60W 30/165* | (2012.01) | |

(52) U.S. Cl.
CPC .......... *B60W 10/10* (2013.01); *B60W 10/184* (2013.01); *B60W 10/20* (2013.01); *B60W 10/22* (2013.01); *B60W 30/14* (2013.01); *B60W 30/165* (2013.01); *B60W 30/18* (2013.01); *B60W 40/13* (2013.01); *G01G 19/022* (2013.01); *G01G 19/086* (2013.01); *G05D 1/0088* (2013.01); *G05D 1/02* (2013.01); *G05D 1/0278* (2013.01); *G05D 1/0285* (2013.01); *G05D 1/0295* (2013.01); *G07C 5/008* (2013.01); *G08G 1/22* (2013.01); *B60W 2300/12* (2013.01); *B60W 2510/0657* (2013.01); *B60W 2510/1005* (2013.01); *B60W 2520/28* (2013.01); *B60W 2530/10* (2013.01); *B60W 2530/20* (2013.01); *B60W 2540/10* (2013.01); *B60W 2550/302* (2013.01); *B60W 2550/306* (2013.01); *B60W 2550/308* (2013.01); *B60W 2550/406* (2013.01); *B60W 2550/408* (2013.01); *B60W 2710/0605* (2013.01); *B60W 2710/0627* (2013.01); *B60W 2710/0661* (2013.01); *B60W 2710/0666* (2013.01); *B60W 2710/1005* (2013.01); *B60W 2710/20* (2013.01); *B60W 2710/22* (2013.01); *G01S 19/13* (2013.01); *G05D 2201/0213* (2013.01); *H04L 67/12* (2013.01); *H04W 4/46* (2018.02); *H04W 84/005* (2013.01)

(56) References Cited

U.S. PATENT DOCUMENTS

| | | | |
|---|---|---|---|
| 5,166,881 | A | 11/1992 | Akasu |
| 5,331,561 | A | 7/1994 | Barrett et al. |
| 5,572,449 | A | 11/1996 | Ting et al. |
| 5,633,456 | A | 5/1997 | Stander |
| 5,680,122 | A | 10/1997 | Mio |
| 5,777,451 | A * | 7/1998 | Kobayashi ............ B61L 23/34 180/169 |
| 5,781,119 | A | 7/1998 | Yamashita et al. |
| 5,815,825 | A | 9/1998 | Tachibana et al. |
| 5,880,958 | A * | 3/1999 | Helms .................... G08G 1/202 340/991 |
| 6,032,097 | A | 2/2000 | Iihoshi et al. |
| 6,125,321 | A | 9/2000 | Tabata et al. |
| 6,128,559 | A | 10/2000 | Saitou et al. |
| 6,188,950 | B1 | 2/2001 | Tsutsumi et al. |
| 6,265,990 | B1 | 7/2001 | Isogai et al. |
| 6,285,929 | B1 | 9/2001 | Hashimoto |
| 6,345,603 | B1 | 2/2002 | Abboud et al. |
| 6,356,820 | B1 | 3/2002 | Hashimoto et al. |
| 6,397,149 | B1 | 5/2002 | Hashimoto |
| 6,418,370 | B1 | 7/2002 | Isogai et al. |
| 6,484,078 | B1 | 11/2002 | Kageyama |
| 6,510,381 | B2 | 1/2003 | Grounds et al. |
| 6,604,038 | B1 * | 8/2003 | Lesesky ................ G07C 5/008 340/988 |
| 6,633,006 | B1 * | 10/2003 | Wolf ...................... B60T 8/172 177/136 |
| 6,879,910 | B2 | 4/2005 | Shike et al. |
| 6,898,585 | B2 | 5/2005 | Benson et al. |
| 6,963,795 | B2 | 11/2005 | Haissig et al. |
| 6,975,246 | B1 | 12/2005 | Trudeau |
| 7,286,825 | B2 | 10/2007 | Shishido et al. |
| 7,460,951 | B2 | 12/2008 | Altan et al. |
| 7,554,435 | B2 | 6/2009 | Tengler et al. |
| 7,593,811 | B2 | 9/2009 | Schmidt et al. |
| 7,596,811 | B2 | 9/2009 | Schmidt et al. |
| 7,729,823 | B2 | 6/2010 | Ruoppolo |
| 7,782,227 | B2 | 8/2010 | Boss et al. |
| 7,831,345 | B2 * | 11/2010 | Heino ...................... B62D 1/28 299/1.9 |
| 7,894,982 | B2 | 2/2011 | Reeser et al. |
| 8,026,833 | B2 | 9/2011 | Villaume et al. |
| 8,073,574 | B2 | 12/2011 | Yamamoto et al. |
| 8,116,921 | B2 | 2/2012 | Ferrin et al. |
| 8,139,109 | B2 | 3/2012 | Broggi et al. |
| 8,224,551 | B2 | 7/2012 | Grolle et al. |
| 8,275,491 | B2 | 9/2012 | Ferrin et al. |
| 8,326,473 | B2 | 12/2012 | Simpson et al. |
| 8,352,111 | B2 | 1/2013 | Mudalige |
| 8,352,112 | B2 | 1/2013 | Mudalige |
| 8,354,955 | B2 | 1/2013 | Miyake et al. |
| 8,442,735 | B2 | 5/2013 | Hrovat et al. |
| 8,538,656 | B2 | 9/2013 | Yamashiro |
| 8,554,468 | B1 * | 10/2013 | Bullock ................. G01S 19/14 701/408 |
| 8,618,922 | B2 | 12/2013 | Debouk et al. |
| 8,620,517 | B2 | 12/2013 | Caveney et al. |
| 8,660,779 | B2 | 2/2014 | Shida |
| 8,666,587 | B2 | 3/2014 | Anderson |
| 8,676,466 | B2 | 3/2014 | Mudalige |
| 8,682,511 | B2 | 3/2014 | Andreasson |
| 8,688,349 | B2 | 4/2014 | Grolle et al. |
| 8,738,238 | B2 | 5/2014 | Rekow |
| 8,744,666 | B2 | 6/2014 | Switkes et al. |
| 8,775,060 | B2 | 7/2014 | Solyom et al. |
| 8,798,907 | B2 | 8/2014 | Shida |
| 8,947,531 | B2 | 2/2015 | Fischer et al. |
| 8,948,995 | B2 | 2/2015 | Pandita et al. |
| 8,954,272 | B2 | 2/2015 | Adam et al. |
| 8,970,401 | B2 | 3/2015 | Molander et al. |
| 9,037,389 | B2 | 5/2015 | You |
| 9,079,587 | B1 | 7/2015 | Rupp et al. |
| 9,141,112 | B1 | 9/2015 | Loo et al. |
| 9,145,137 | B2 | 9/2015 | Doi et al. |

(56) References Cited

U.S. PATENT DOCUMENTS

| | | | |
|---|---|---|---|
| 9,174,672 B2 | 11/2015 | Zeng et al. | |
| 9,221,396 B1 | 12/2015 | Zhu et al. | |
| 9,224,300 B2 | 12/2015 | Lee et al. | |
| 9,355,423 B1 | 5/2016 | Slusar | |
| 9,367,065 B2 | 6/2016 | Dolgov et al. | |
| 9,396,661 B2 | 7/2016 | Okamoto | |
| 9,423,794 B2 | 8/2016 | Lind et al. | |
| 9,449,258 B1 | 9/2016 | Palacio et al. | |
| 9,460,622 B1 | 10/2016 | Ferguson et al. | |
| 9,494,944 B2 | 11/2016 | Alam et al. | |
| 9,582,006 B2 | 2/2017 | Switkes et al. | |
| 9,598,078 B2 | 3/2017 | Moran et al. | |
| 9,613,466 B1* | 4/2017 | Bullock | G01S 19/14 |
| 9,616,743 B1 | 4/2017 | Mays et al. | |
| 9,632,507 B1* | 4/2017 | Korn | G05D 1/0293 |
| 9,645,579 B2 | 5/2017 | Switkes et al. | |
| 9,665,102 B2 | 5/2017 | Switkes et al. | |
| 9,721,474 B2 | 8/2017 | Eskilson | |
| 9,771,070 B2 | 9/2017 | Zagorski et al. | |
| 9,799,224 B2 | 10/2017 | Okamoto | |
| 9,823,166 B2* | 11/2017 | Dudar | B60W 40/02 |
| 9,852,475 B1 | 12/2017 | Konrardy et al. | |
| 9,878,657 B2 | 1/2018 | Wunsche, III et al. | |
| 9,884,631 B2 | 2/2018 | James et al. | |
| 9,927,816 B2 | 3/2018 | Li et al. | |
| 9,928,746 B1* | 3/2018 | MacNeille | G08G 1/0133 |
| 9,940,840 B1 | 4/2018 | Schubert et al. | |
| 10,017,039 B1 | 7/2018 | Colavincenzo | |
| 10,017,179 B2 | 7/2018 | Alden et al. | |
| 10,027,024 B2 | 7/2018 | Powell | |
| 2001/0001138 A1 | 5/2001 | Zhu et al. | |
| 2002/0077748 A1* | 6/2002 | Nakano | G01C 21/3492 701/410 |
| 2002/0152015 A1 | 10/2002 | Seto | |
| 2002/0198632 A1 | 12/2002 | Breed et al. | |
| 2003/0094858 A1 | 5/2003 | Shiue et al. | |
| 2004/0046448 A1 | 3/2004 | Brown | |
| 2004/0078133 A1* | 4/2004 | Miller | B60K 31/0008 701/96 |
| 2004/0140143 A1 | 7/2004 | Saeki | |
| 2004/0245853 A1 | 12/2004 | Odagawa et al. | |
| 2004/0252863 A1 | 12/2004 | Chang et al. | |
| 2006/0074557 A1 | 4/2006 | Mulligan et al. | |
| 2006/0095195 A1* | 5/2006 | Nishimura | B60W 30/025 701/96 |
| 2006/0106534 A1 | 5/2006 | Kawamata et al. | |
| 2006/0161341 A1 | 7/2006 | Haegebarth et al. | |
| 2006/0229804 A1* | 10/2006 | Schmidt | G05D 1/0278 701/466 |
| 2007/0027614 A1 | 2/2007 | Reeser et al. | |
| 2007/0043502 A1 | 2/2007 | Mudalige et al. | |
| 2007/0060045 A1 | 3/2007 | Prautzsch | |
| 2007/0210953 A1 | 9/2007 | Abraham et al. | |
| 2007/0213915 A1 | 9/2007 | Tange | |
| 2007/0233337 A1 | 10/2007 | Plishner | |
| 2007/0256481 A1* | 11/2007 | Nishiyama | G01F 9/02 73/114.52 |
| 2007/0276597 A1 | 11/2007 | Kato et al. | |
| 2008/0009985 A1 | 1/2008 | Plishner | |
| 2008/0033649 A1 | 2/2008 | Hasegawa et al. | |
| 2008/0059007 A1 | 3/2008 | Whittaker et al. | |
| 2008/0119965 A1 | 5/2008 | McCrary | |
| 2008/0122652 A1 | 5/2008 | Tengler et al. | |
| 2008/0249667 A1 | 10/2008 | Horvitz et al. | |
| 2008/0255722 A1* | 10/2008 | McClellan | B60R 25/102 701/31.4 |
| 2008/0258890 A1* | 10/2008 | Follmer | B60R 25/102 340/439 |
| 2009/0012666 A1 | 1/2009 | Simpson et al. | |
| 2009/0051510 A1* | 2/2009 | Follmer | G07C 5/008 340/425.5 |
| 2009/0062974 A1 | 3/2009 | Tamamoto et al. | |
| 2009/0079839 A1* | 3/2009 | Fischer | G01S 7/003 348/218.1 |
| 2009/0115638 A1* | 5/2009 | Shankwitz | G01C 21/26 340/988 |
| 2009/0118889 A1* | 5/2009 | Heino | B62D 1/28 701/24 |
| 2009/0157461 A1* | 6/2009 | Wright | G06Q 10/06 705/7.23 |
| 2009/0164082 A1 | 6/2009 | Kobayashi et al. | |
| 2009/0198427 A1 | 8/2009 | Christopher et al. | |
| 2009/0222186 A1 | 9/2009 | Jensen | |
| 2009/0271083 A1* | 10/2009 | Kumar | B60T 13/665 701/70 |
| 2009/0286648 A1* | 11/2009 | Vesenjak | F16H 61/143 477/70 |
| 2009/0287412 A1 | 11/2009 | Menzel et al. | |
| 2009/0326799 A1* | 12/2009 | Crook | G06Q 30/02 701/533 |
| 2010/0045507 A1 | 2/2010 | Yamano et al. | |
| 2010/0049374 A1* | 2/2010 | Ferrin | G05D 1/0227 701/1 |
| 2010/0094509 A1 | 4/2010 | Luke et al. | |
| 2010/0106356 A1 | 4/2010 | Trepagnier et al. | |
| 2010/0194638 A1 | 8/2010 | Rivard | |
| 2010/0256835 A1 | 10/2010 | Mudalige | |
| 2010/0256836 A1 | 10/2010 | Mudalige | |
| 2010/0256852 A1* | 10/2010 | Mudalige | G08G 1/163 701/24 |
| 2010/0332101 A1 | 12/2010 | Braunberger et al. | |
| 2011/0010022 A1 | 1/2011 | Beavin | |
| 2011/0083011 A1 | 4/2011 | DiCrescenzo | |
| 2011/0112730 A1 | 5/2011 | Rekow | |
| 2011/0118967 A1 | 5/2011 | Tsuda | |
| 2011/0184596 A1 | 7/2011 | Andreasson | |
| 2011/0184605 A1 | 7/2011 | Neff | |
| 2011/0210872 A1 | 9/2011 | Molander | |
| 2011/0270514 A1 | 11/2011 | Shida | |
| 2011/0270520 A1* | 11/2011 | Kronenberg | B62D 12/02 701/533 |
| 2011/0274523 A1* | 11/2011 | Petalas | E04H 6/285 414/231 |
| 2011/0301779 A1 | 12/2011 | Shida | |
| 2012/0061154 A1* | 3/2012 | Pfister | G01M 17/007 180/14.2 |
| 2012/0089294 A1 | 4/2012 | Fehse et al. | |
| 2012/0105270 A1 | 5/2012 | Miyake et al. | |
| 2012/0109610 A1 | 5/2012 | Anderson et al. | |
| 2012/0139549 A1 | 6/2012 | Sufrin-Disler et al. | |
| 2012/0166057 A1 | 6/2012 | Amato et al. | |
| 2012/0206282 A1 | 8/2012 | Gorbold | |
| 2012/0221235 A1* | 8/2012 | Prudhomme-Lacroix | B64D 9/00 701/124 |
| 2012/0226965 A1 | 9/2012 | Hammerschmidt et al. | |
| 2012/0252415 A1 | 10/2012 | Menzel et al. | |
| 2012/0259516 A1 | 10/2012 | Grolle et al. | |
| 2012/0259538 A1 | 10/2012 | Oexmann | |
| 2013/0015984 A1 | 1/2013 | Yamashiro | |
| 2013/0018766 A1 | 1/2013 | Christman | |
| 2013/0024084 A1 | 1/2013 | Yamashiro | |
| 2013/0030606 A1* | 1/2013 | Mudalige | G08G 1/22 701/2 |
| 2013/0030657 A1 | 1/2013 | Chatterjee et al. | |
| 2013/0041567 A1 | 2/2013 | Yamashiro | |
| 2013/0041576 A1 | 2/2013 | Switkes et al. | |
| 2013/0066511 A1* | 3/2013 | Switkes | G08G 1/166 701/28 |
| 2013/0079953 A1 | 3/2013 | Kumabe | |
| 2013/0080040 A1 | 3/2013 | Kumabe | |
| 2013/0080041 A1* | 3/2013 | Kumabe | G05D 1/024 701/117 |
| 2013/0116861 A1 | 5/2013 | Nemoto | |
| 2013/0124064 A1 | 5/2013 | Nemoto | |
| 2013/0138330 A1* | 5/2013 | Xu | G06Q 10/0834 701/117 |
| 2013/0151058 A1 | 6/2013 | Zagorski et al. | |
| 2013/0173114 A1 | 7/2013 | Pillai | |
| 2013/0211624 A1* | 8/2013 | Lind | G05D 1/0278 701/2 |
| 2013/0218365 A1 | 8/2013 | Caveney et al. | |

(56) References Cited

U.S. PATENT DOCUMENTS

| | | | |
|---|---|---|---|
| 2013/0231820 A1 | 9/2013 | Solyom et al. | |
| 2013/0317676 A1 | 11/2013 | Cooper et al. | |
| 2013/0325306 A1 | 12/2013 | Caveney et al. | |
| 2014/0005875 A1 | 1/2014 | Hartmann et al. | |
| 2014/0005906 A1 | 1/2014 | Pandita et al. | |
| 2014/0019031 A1 | 1/2014 | Solyom et al. | |
| 2014/0100734 A1 | 4/2014 | Yamashiro | |
| 2014/0107867 A1 | 4/2014 | Yamashiro | |
| 2014/0129075 A1 | 5/2014 | Carleton | |
| 2014/0142799 A1 | 5/2014 | Ferguson et al. | |
| 2014/0142801 A1 | 5/2014 | Shah | |
| 2014/0145838 A1 | 5/2014 | Tuukkanen | |
| 2014/0156118 A1 | 6/2014 | Wiemeyer et al. | |
| 2014/0172265 A1 | 6/2014 | Funabashi | |
| 2014/0197967 A1 | 7/2014 | Modica et al. | |
| 2014/0214255 A1 | 7/2014 | Dolgov et al. | |
| 2014/0222278 A1 | 8/2014 | Fujita | |
| 2014/0236449 A1 | 8/2014 | Horn | |
| 2014/0244144 A1 | 8/2014 | You | |
| 2014/0249693 A1 | 9/2014 | Stark et al. | |
| 2014/0277608 A1 | 9/2014 | Debouk et al. | |
| 2014/0303870 A1 | 10/2014 | Switkes et al. | |
| 2014/0306799 A1 | 10/2014 | Ricci | |
| 2014/0306826 A1 | 10/2014 | Ricci | |
| 2014/0309836 A1 | 10/2014 | Ollis | |
| 2014/0316671 A1 | 10/2014 | Okamoto | |
| 2014/0316865 A1 | 10/2014 | Okamoto | |
| 2014/0324339 A1 | 10/2014 | Adam et al. | |
| 2014/0336892 A1* | 11/2014 | Braunberger | B60T 8/32 |
| | | | 701/70 |
| 2014/0350756 A1* | 11/2014 | Schoonmaker | B61L 15/0081 |
| | | | 701/19 |
| 2014/0350793 A1 | 11/2014 | Schrabler et al. | |
| 2014/0350835 A1 | 11/2014 | Martin | |
| 2015/0012204 A1 | 1/2015 | Breuer et al. | |
| 2015/0015267 A1 | 1/2015 | Mueller et al. | |
| 2015/0025731 A1 | 1/2015 | Uehara | |
| 2015/0061492 A1 | 3/2015 | Braunberger | |
| 2015/0100192 A1 | 4/2015 | Lee et al. | |
| 2015/0120137 A1 | 4/2015 | Zeng et al. | |
| 2015/0151737 A1 | 6/2015 | Birch et al. | |
| 2015/0153733 A1 | 6/2015 | Ohmura et al. | |
| 2015/0161894 A1 | 6/2015 | Duncan et al. | |
| 2015/0262481 A1 | 9/2015 | Selin | |
| 2015/0279122 A1* | 10/2015 | Lorenzen | G07B 15/063 |
| | | | 705/13 |
| 2015/0314790 A1 | 11/2015 | Deragarden et al. | |
| 2015/0334371 A1 | 11/2015 | Galera et al. | |
| 2015/0356635 A1 | 12/2015 | Thurston | |
| 2015/0378722 A1 | 12/2015 | Zuniga-Hernandez | |
| 2016/0009288 A1* | 1/2016 | Yu | B60W 40/076 |
| | | | 701/41 |
| 2016/0019782 A1 | 1/2016 | Alam et al. | |
| 2016/0026187 A1 | 1/2016 | Alam et al. | |
| 2016/0054735 A1* | 2/2016 | Switkes | G08G 1/22 |
| | | | 701/23 |
| 2016/0194014 A1* | 7/2016 | Rajendran | B61L 27/0005 |
| | | | 701/2 |
| 2016/0267796 A1* | 9/2016 | Hiroma | G08G 1/22 |
| 2016/0272207 A1* | 9/2016 | Dolgov | B60W 30/16 |
| 2016/0300186 A1* | 10/2016 | Scharaswak | G06Q 10/0835 |
| 2016/0359741 A1* | 12/2016 | Cooper | B61C 17/12 |
| 2016/0373261 A1 | 12/2016 | Tschache et al. | |
| 2016/0375732 A1 | 12/2016 | Lazar et al. | |
| 2017/0011633 A1 | 1/2017 | Boegel | |
| 2017/0058477 A1 | 3/2017 | Niroumand | |
| 2017/0069203 A1 | 3/2017 | Sharma | |
| 2017/0083844 A1 | 3/2017 | Baker et al. | |
| 2017/0115666 A1* | 4/2017 | Kolhouse | G08G 1/017 |
| 2017/0122841 A1 | 5/2017 | Dudar et al. | |
| 2017/0132299 A1* | 5/2017 | Fox | G06F 17/30563 |
| 2017/0146801 A1 | 5/2017 | Stempora | |
| 2017/0178536 A1* | 6/2017 | Manci | G06Q 10/0639 |
| 2017/0186327 A1 | 6/2017 | Uysal et al. | |
| 2017/0197615 A1* | 7/2017 | Elie | B60W 10/20 |
| 2017/0227972 A1 | 8/2017 | Sabau | |
| 2017/0235316 A1* | 8/2017 | Shattil | B64C 39/024 |
| | | | 701/3 |
| 2017/0242095 A1 | 8/2017 | Schuh et al. | |
| 2017/0261997 A1* | 9/2017 | Switkes | G08G 1/166 |
| 2017/0289864 A1 | 10/2017 | Narasimha et al. | |
| 2017/0293296 A1 | 10/2017 | Stenneth et al. | |
| 2017/0308097 A1* | 10/2017 | Switkes | G08G 1/22 |
| 2017/0309187 A1 | 10/2017 | Lin | |
| 2017/0323244 A1* | 11/2017 | Rani | G06Q 10/06393 |
| 2017/0329348 A1 | 11/2017 | Li et al. | |
| 2017/0344023 A1* | 11/2017 | Laubinger | G05D 1/0272 |
| 2017/0349058 A1* | 12/2017 | Bernier | H02J 13/001 |
| 2017/0349176 A1* | 12/2017 | Alden | H04W 4/44 |
| 2017/0361762 A1 | 12/2017 | Wunsche, III et al. | |
| 2018/0006365 A1 | 1/2018 | Powell | |
| 2018/0018605 A1 | 1/2018 | Light-Holets et al. | |
| 2018/0032072 A1 | 2/2018 | Hoye | |
| 2018/0047293 A1 | 2/2018 | Dudar | |
| 2018/0050697 A1* | 2/2018 | Kuszmaul | G01S 19/14 |
| 2018/0074514 A1 | 3/2018 | Switkes et al. | |
| 2018/0082590 A1 | 3/2018 | MacNeille et al. | |
| 2018/0082591 A1* | 3/2018 | Pandy | B60W 10/04 |
| 2018/0084511 A1 | 3/2018 | Wu et al. | |
| 2018/0111611 A1 | 4/2018 | MacNeille et al. | |
| 2018/0120861 A1 | 5/2018 | Saxena et al. | |
| 2018/0137763 A1 | 5/2018 | Deragarden et al. | |
| 2018/0188725 A1 | 7/2018 | Cremona et al. | |
| 2018/0188745 A1 | 7/2018 | Pilkington | |
| 2018/0188746 A1 | 7/2018 | Lesher et al. | |
| 2018/0190119 A1 | 7/2018 | Miller, Jr. et al. | |
| 2018/0190128 A1 | 7/2018 | Saigusa | |
| 2018/0210461 A1 | 7/2018 | Cremona et al. | |

FOREIGN PATENT DOCUMENTS

| | | |
|---|---|---|
| EP | 0 991 046 | 3/2005 |
| EP | 1 975 901 | 3/2009 |
| EP | 2 390 744 | 11/2011 |
| EP | 3316064 | 5/2018 |
| GB | 2540039 | 1/2017 |
| GB | 2551248 | 12/2017 |
| GB | 2557001 | 6/2018 |
| GB | 2557434 | 6/2018 |
| GB | 2558051 | 7/2018 |
| JP | 05-170008 | 7/1993 |
| JP | 2995970 | 12/1999 |
| JP | 2010-030525 | 2/2010 |
| JP | 5141849 | 2/2013 |
| JP | 2017-215681 | 12/2017 |
| WO | WO 2004/077378 | 9/2004 |
| WO | WO 2009/024563 | 2/2009 |
| WO | WO 2009/043643 | 4/2009 |
| WO | WO 2011/125193 | 10/2011 |
| WO | WO 2013/006826 | 1/2013 |
| WO | WO 2013/165297 | 4/2013 |
| WO | WO 2013/147682 | 10/2013 |
| WO | WO 2013/187835 | 12/2013 |
| WO | WO 2014/062118 | 4/2014 |
| WO | WO 2014/092628 | 6/2014 |
| WO | WO 2014/133425 | 9/2014 |
| WO | WO 2014/137270 | 9/2014 |
| WO | WO 2014/137271 | 9/2014 |
| WO | WO 2014/145918 | 9/2014 |
| WO | WO 2015/047174 | 4/2015 |
| WO | WO 2015/047175 | 4/2015 |
| WO | WO 2015/047176 | 4/2015 |
| WO | WO 2015/047177 | 4/2015 |
| WO | WO 2015/047178 | 4/2015 |
| WO | WO 2015/047179 | 4/2015 |
| WO | WO 2015/047181 | 4/2015 |
| WO | WO 2015/047182 | 4/2015 |
| WO | WO 2015/156731 | 10/2015 |
| WO | WO 2016/065055 | 4/2016 |
| WO | WO 2016/087555 | 6/2016 |
| WO | WO 2016/087901 | 6/2016 |
| WO | WO 2016/134610 | 9/2016 |
| WO | WO 2016/134770 | 9/2016 |

(56) References Cited

FOREIGN PATENT DOCUMENTS

| | | |
|---|---|---|
| WO | WO 2016/135207 | 9/2016 |
| WO | WO 2016/182489 | 11/2016 |
| WO | WO 2017/048165 | 3/2017 |
| WO | WO 2017/070714 | 4/2017 |
| WO | WO 2017/148113 | 9/2017 |
| WO | WO 2017/164792 | 9/2017 |
| WO | WO 2017/179193 | 10/2017 |
| WO | WO 2017/184062 | 10/2017 |
| WO | WO 2017/184063 | 10/2017 |
| WO | WO 2017/196165 | 11/2017 |
| WO | WO 2017/200433 | 11/2017 |
| WO | WO 2017/204712 | 11/2017 |
| WO | WO 2017/209124 | 12/2017 |
| WO | WO 2017/209666 | 12/2017 |
| WO | WO 2018/000386 | 1/2018 |
| WO | WO 2018/035145 | 2/2018 |
| WO | WO 2018/039114 | 3/2018 |
| WO | WO 2018/043519 | 3/2018 |
| WO | WO 2018/043520 | 3/2018 |
| WO | WO 2018/043753 | 3/2018 |
| WO | WO 2018/054520 | 3/2018 |
| WO | WO 2018/106774 | 6/2018 |
| WO | WO 2018/111177 | 6/2018 |
| WO | WO 2018/135630 | 7/2018 |
| WO | WO 2018/137754 | 8/2018 |

OTHER PUBLICATIONS

Shladover et al., "Development and Evaluation of Selected Mobility Applications for VII (a.k.a. IntelliDrive)", http://slideplayer.com/slide/6981587/, Jul. 1, 2009.

Tsugawa, "An Overview on an Automated Truck Platoon Within the Energy ITS Project", 7th IFAC Symposium on Advances in Automotive Control, Tokyo, Japan, Sep. 4-7, 2013.

Sugimachi et al., "Development of Autonomous Platooning System for Heavy-Duty Trucks", 7th IFAC Symposium on Advances in Automotive Control, Tokyo, Japan, Sep. 4-7, 2013.

Sheikholeslam et al., "Longitudinal Control of a Platoon of Vehicles; III; Nonlinear Model", Program on Advanced Technology for the Highway, Institute of Transportation Studies, University of California at Berkeley, Apr. 1, 1990.

Sheikholeslam et al., "Longitudinal Control of a Platoon of Vehicles", Department of Electrical Engineering and Computer Science, University of California, Berkeley, May 1990.

Sheikholeslam et al., "A System Level Study of the Longitudinal Control of a Platoon of Vehicles", Department of Electrical Engineering and Computer Science, University of California, Berkeley, Jun. 1992.

Porche et al., "Real Time Task Manager for Communications and Control in Multicar Platoons", Department of Electrical Engineering and Computer Science, University of California, Berkeley, Jun. 1992.

Gerdes et al., "Brake System Requirements for Platooning on an Automated Highway", Department of Mechanical Engineering, University of California, Berkeley, Jun. 1995.

Zabat et al., "The Aerodynamic Performance of Platoons: Final Report", California PATH Research Report, California PATH Program, Institute of Transportation Studies, University of California, Berkeley, Oct. 1995.

Gerdes et al., "Vehicle Speed and Spacing Control via Coordinated Throttle and Brake Actuation", Department of Mechanical Engineering, University of California, Berkeley, Sep. 1997.

Alvarez et al., "Safe Platooning in Automated Highway Systems Part I: Safety Regions Design", Department of Mechanical Engineering, University of California, Berkeley, 1999.

Alvarez et al., "Safe Platooning in Automated Highway Systems Part II: Velocity Tracking Controller", Department of Mechanical Engineering, University of California, Berkeley, 1999.

Michaelian et al., "Field Experiments Demonstrate Fuel Savings for Close-Following", University of Southern California, California PATH Research Report, Sep. 2000.

Simon Halle, "Automated Highway Systems: Platoons of Vehicles Viewed as a Multiagent System", University of Quebec, Jun. 2005.

Friedrichs et al., "A Generic Software Architecture for a Driver Information System to Organize and Operate Truck Platoons", https://www.researchgate.net/publication/256195846, May 2008.

Meisen et al., "A Data-Mining Technique for the Planning and Organization of Truck Platoons", https://www.researchgate.net/publication/256195756, May 2008.

Ramakers et al., "Electronically Coupled Truck platoons on German Highways", IEEE International Conference on Systems, Man, and Cybernetics, San Antonio, TX, Oct. 2009.

Kunze et al., "Organization and Operation of Electronically Coupled Truck Platoons on German Highways", RWTH Aachen University, Center for Learning and Knowledge Management and Department of Information Management in Mechanical Engineering, Aachen, Germany, Dec. 2009.

Kunze et al., "Efficient Organization of Truck Platoons by Means of Data Mining", 7th International Conference on Informatics in Control, Automation and Robotics, RWTH Aachen University, Center for Learning and Knowledge Management and Department of Information Management in Mechanical Engineering, Aachen, Germany, Jan. 2010.

Jacobson et al., "Functional Safety in Systems of Road Vehicles", SP Technical Research Institute of Sweden, Jul. 2010.

Nowakowski et al., "Cooperative Adaptive Cruise Control: Testing Driver's Choices of Following Distances", California PATH Program, Institute of Transportation Studies, University of California, Berkeley, Jan. 2011.

Tsugawa et al., "An Automated Truck Platoon for Energy Saving", IEEE/RSJ International Conference on Intelligent Robots and Systems, San Francisco, CA, Sep. 25-30, 2011.

Desjardins et al., "Cooperative Adaptive Cruise Control: A Reinforcement Learning Approach", IEEE Transactions on Intelligent Transportation Systems, vol. 12, No. 4, Dec. 2011.

Larson et al., "Coordinated Route Optimization for Heavy-duty Vehicle Platoons", Proceedings of the 16th International IEEE Annual Conference on Intelligent Transportation Systems (ITSC 2013), The Hague, The Netherlands, Oct. 6-9, 2013.

Aoki, "Research and Development of Fully Automated Vehicles", ITS Research Division, Japan Automobile Research Institute, Tokyo, Japan, Nov. 2013.

Lu et al., "Automated Truck Platoon Control and Field Test, Road Vehicle Automation", https://www.researchgate.net/publication/266390502, Aug. 2014.

White Paper, "Automated Driving and Platooning Issues and Opportunities", ATA Technology and Maintenance Council Future Truck Program, Sep. 21, 2015.

Nowakowski et al., "Cooperative Adaptive Cruise Control (CACC) for Truck Platooning: Operational Concept Alternatives", California PATH, California Partners for Advanced Transportation Technology, UC Berkeley, Mar. 2015.

Erlien, "Shared Vehicle Control Using Safe Driving Envelopes for Obstacle Avoidance and Stability", A Dissertation submitted to the Department of Mechanical Engineering and the Committee on Graduate Studies of Stanford University, Mar. 2015.

Shladover et al., "Cooperative Adaptive Cruise Control, Definitions and Operating Concepts", Transportation Research Record 2489, 2015.

Tsugawa et al., "A Review of Truck Platooning Projects for Energy Savings", IEEE Transactions on Intelligent Vehicles, vol. 1, No. 1, Mar. 2016.

Geiger et al., "Team AnnieWAY's Entry to the 2011 Grand Cooperative Driving Challenge", IEEE Transactions on Intelligent Transportation Systems, vol. 13, No. 3, Sep. 2012.

Bergenheim et al., "Vehicle-to-Vehicle Communication for a Platooning System", SP Technical Research Institute of Sweden, Procedia—Social and Behavioral Sciences vol. 48, 2012.

Bae et al., "Road Grade and Vehicle Parameter Estimation for Longitudinal Control Using GPS", 2001 IEEE Intelligent Transportation Systems Conference Proceedings, Oakland, CA, Aug. 25-29, 2001.

(56) References Cited

OTHER PUBLICATIONS

Holm, "Vehicle Mass and Road Grade Estimation Using Kalman Filter", MSc Thesis, Department of Electrical Engineering, Sweden, Aug. 2011.
Kidambi et al., "Methods in Vehicle Mass and Road Grade Estimation", SAE International, University of Michigan, Apr. 1, 2014.
Paulsson et al., "Vehicle Mass and Road Grade Estimation Using Recursive Least Squares", MSc Thesis, Lund University, 2016.
Montvey, et al., Priority Document associated with EP Application No. 03 100457.5., Feb. 25, 2003.
International Search Report and Written Opinion dated Dec. 11, 2017 from International Application No. PCT/US2017/047771.
Schuh et al., U.S. Appl. No. 15/936,271, filed Mar. 26, 2018.
Switkes et al., U.S. Appl. No. 15/926,809, filed Mar. 20, 2018.
Switkes et al., U.S. Appl. No. 15/908,745, filed Feb. 28, 2018.
Bergenheim et al., "Overview of Platooning Systems", http://publications.lib.chalmers.se/records/fulltext/174621.pdf, 2012.
Klaus et al., U.S. Appl. No. 15/860,024, filed Jan. 2, 2018.
Switkes et al., U.S. Appl. No. 15/926,813, filed Mar. 20, 2018.
Switkes et al., U.S. Appl. No. 15/908,677, filed Feb. 28, 2018.
U.S. Office Action dated May 3, 2018 from U.S. Appl. No. 15/908,677.
U.S. Final Office Action dated Jun. 29, 2018 from U.S. Appl. No. 15/908,677.
Notice of Allowance dated Oct. 16, 2018 from U.S. Appl. No. 15/908,677.
"Automated Highway System: Milestone 2 Report, Task C2: Downselect System Configurations and Workshop #3" (National Automated Highway System Consortium, Troy, MI, Jun. 1997), 604 pages.
Wille, Matthias et al., "KONVOI: Electronically coupled truck convoys", in Human Factors for Assistance and Automation, D. de Waard et al. (Eds.) (Shaker Publishing, Maastricht, the Netherlands, Jan. 2008), pp. 243-256.
Shladover, Steven E. et al. "Development and Evaluation of Selected Mobility Applications for VII: Concept of Operations", California PATH Working Paper UCB-ITS-PWP-2009-3 (U.C. Berkeley, Berkeley, CA, Mar. 2009), 14 pages.
Al Alam, Assad et al. "Establishing Safety for Heavy Duty Vehicle Platooning: A Game Theoretical Approach", Proceedings of the 18th World Congress, The International Federation of Automatic Control (IFAC'11) Milano, Italy, Sep. 2011, pp. 3818-3823.
Roeth, Michael, "CR England Peloton Technology Platooning Test Nov. 2013", (North American Council on Freight Efficiency (NACFE.org), Fort Wayne, IN, Dec. 2013);Retrieved Aug. 23, 2018 at https://nacfe.org/wp-content/uploads/2018/02/Peloton-NACFE-Fuel-Test-Report-120213.pdf.
Bevly, David et al. "Heavy Truck Cooperative Adaptive Cruise Control: Evaluation, Testing, and Stakeholder Engagement for Near Term Deployment: Phase One Final Report", Report to Federal Highway Administration (Auburn University, Auburn, AL, Apr. 2015), 135 pages; Retrieved Aug. 23, 2018 at http://atri-online.org/wp-content/uploads/2015/05/DATPPhase1FinalReport.pdf.
Nowakowski, Christopher et al., "Heavy vehicle automation: Human factors lessons learned", Procedia Manufacturing vol. 3, Jul. 2015, pp. 2945-2952.
Zhao, Siyang et al., "Vehicle to Vehicle Communication and Platooning for EV with Wireless Sensor Network", SICE Annual Conference 2015, Hangzhou, China, Jul. 2015, pp. 1435-1440.
Brizzolara, Davide & Toth, Andrea, "The Emergence of Truck Platooning", Baltic Transport Journal, Mar. 2016, pp. 58-59.

\* cited by examiner

MASS ESTIMATION USES
ON VEHICLE

- Path Planning
  - Braking
  - Swerving

- Control
  - Steering Angle
  - Brake Force for De-acceleration
  - Magnitude of Torque Demand

- Actuators
  - Steering torque
  - Brake Pressure
  - Throttle

1300

APPLICATIONS FOR USING MASS ESTIMATIONS FOR VEHICLES

CROSS-REFERENCE TO RELATED APPLICATIONS

The present application is a Continuation of U.S. application Ser. No. 15/908,677, filed Feb. 28, 2018, which is a Continuation-in-Part of International Application No. PCT/US17/047771, filed Aug. 21, 2017, which claims priority to U.S. Provisional Application No. 62/377,970, filed Aug. 22, 2016.

The present application is also a Continuation-in-Part of U.S. application Ser. No. 15/607,316, filed May 26, 2017, which is a Continuation of U.S. application Ser. No. 14/292,583, filed May 30, 2014 (now U.S. Pat. No. 9,655,102), which is a Divisional of U.S. application Ser. No. 13/542,622 (now U.S. Pat. No. 8,744,666) and Ser. No. 13/542,627 (now U.S. Pat. No. 9,582,006), both filed Jul. 5, 2012 and both claiming the benefit of U.S. Provisional Application No. 61/505,076, filed Jul. 6, 2011.

The present application is further a Continuation-in-Part of U.S. application Ser. No. 15/589,124, filed May 8, 2017, which is a Continuation of U.S. application Ser. No. 14/855,044, filed Sep. 15, 2015 (now U.S. Pat. No. 9,645,579), which is a 371 National Stage Application of PCT/US2014/030770, filed Mar. 17, 2014, which claims the benefit U.S. Provisional Application No. 61/792,304, filed Mar. 15, 2013. The Ser. No. 14/292,583 application is further a Divisional of U.S. application Ser. No. 13/542,622 (now U.S. Pat. No. 8,744,666) and Ser. No. 13/542,627 (now U.S. Pat. No. 9,582,006), both of which claim priority to U.S. Provisional Application No. 61/505,076, filed Jul. 6, 2011.

All of the above listed applications are each incorporated herein by reference in their entirety for all purposes.

FIELD OF THE INVENTION

The present application relates generally to applications for use of mass estimations of a vehicle, and more specifically, using a mass estimation of a vehicle to control operation of the vehicle, sharing the mass estimation with other vehicles and/or a Network Operations Center (NOC), organizing vehicles operating in a platoon or other arrangement of vehicles on the road and/or partially controlling the operation of one or more vehicles operating in a platoon based on the relative mass estimations between the platooning vehicles.

BACKGROUND

The mass estimation for a vehicle is known. For more details on mass estimation for vehicles, see Bae et al., "Road Grade and Vehicle Parameter Estimation for Longitudinal Control Using GPS", 2001 IEEE Intelligent Transportation Systems Conference Proceedings, Oakland, Calif., Aug. 25-29, 2001 and Holm, "Vehicle Mass and Road Grade Estimation Using Kalman Filter", MSc Thesis, Department of Electrical Engineering, Sweden, August 2011, both publications incorporated herein by reference for all purposes.

While algorithms for estimating the mass of a vehicle are known, the application or use of such information is limited. With certain vehicles, mass estimation is used in the control of onboard Automated Braking Systems (ABS). Other than for braking control, however, the Applicant is not aware of other uses or applications for mass estimation information, either onboard or sharing with other vehicles or data centers.

SUMMARY

The present application is directed toward using the mass estimation of a vehicle for a number of applications.

In one application, the mass of a vehicle can be used as part of various methods to control the operation and system(s) on the vehicle itself (e.g., throttle, braking, steering, etc.).

In yet other embodiments, the use of vehicle mass estimations has a number of applications in the context of platooning. Such applications include organizing vehicles in general, arranging for vehicles to operate in a platoon using the relative estimated mass of each of the vehicles to select the lead and the following vehicles(s), scaling commands sent from the lead vehicle to the following vehicles(s) based on the relative mass of the vehicles operating in the platoon, and possibly using the mass estimation of a vehicle to control operations on the vehicle In yet other embodiments, mass estimations, or sensor data used to calculate mass estimations, can be transmitted to a data processing center, such as a Network Operations Center (NOC), which may remotely coordinate the platooning of vehicles. For instance, by coordinating a platoon and communicating the mass of the two (or more) vehicles prior to engagement, the vehicles can immediately assume their proper platoon position (e.g., either the lead vehicle or following vehicle(s)) at their point of contact. In yet other embodiments, a reset function is used for a data processing pipeline used for calculating a mass estimation of a vehicle. In one instance, a primary mass estimation is conducted over a long horizon period of time. In parallel, a second mass estimation is conducted over a short horizon period of time. When the two mass estimates differ by more than a threshold amount, it is assumed the primary mass calculation has been compromised. As a result, the primary mass calculation is reset and started anew with fresh sensor data. In another embodiment, the reset function can be triggered base on (a) a vehicle coming to a stop for more than a threshold period of time, (b) when the vehicle is traveling below a threshold speed or (c) based on a GPS position of the vehicle. In various embodiments, the reset function may be triggered based on any one of (a) through (c) or any combination of (a), (b) and/or (c).

BRIEF DESCRIPTION OF THE DRAWINGS

The invention and the advantages thereof, may best be understood by reference to the following description taken in conjunction with the accompanying drawings in which.

The invention and the advantages thereof, may best be understood by reference to the following description taken in conjunction with the accompanying drawings in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention, including the description of a plurality of different aspects of the invention, including, in some case, one or more alternatives. It will be apparent to those skilled in the art that the invention can be practice without implementing all of the features disclosed herein.

Platooning

The Applicant has proposed various vehicle platooning systems in which a second, and potentially additional, vehicle(s) is/are automatically, or semi-automatically, controlled to closely follow a lead vehicle in a safe manner By way of example, U.S. application Ser. Nos. 15/605,456, 15/607,902; 13/542,622 and 13/542,627; U.S. Provisional Application Nos. 62/377,970 and 62/343,819; and PCT Application Nos. PCT/US2014/030770, PCT/US2016/049143 and PCT/US2016/060167 describe various vehicle platooning systems in which a trailing vehicle is at least partially automatically controlled to closely follow a designated lead vehicle. Each of these earlier applications is incorporated herein by reference.

One of the goals of platooning is typically to maintain a desired longitudinal distance or time headway between the platooning vehicles, which is frequently referred to herein as the "desired gap". That is, it is desirable for the trailing vehicle (e.g., a trailing truck) to maintain a designated gap relative to a specific vehicle (e.g., a lead truck). The vehicles involved in a platoon will typically have sophisticated control systems suitable for initiating a platoon, maintaining the gap under a wide variety of different driving conditions, and gracefully dissolving the platoon as appropriate.

Figure 1:
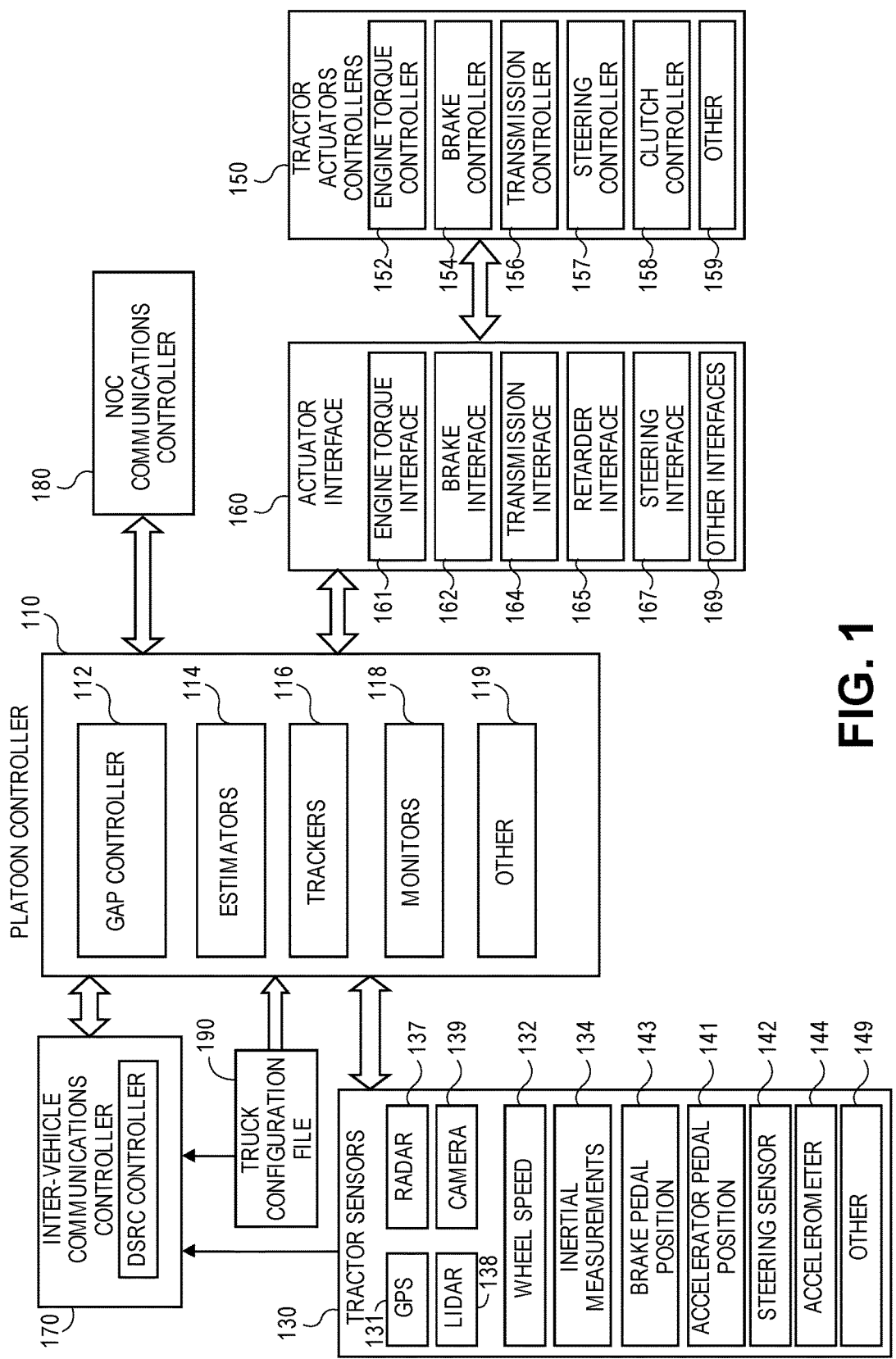
FIG. 1 is a block diagram of a controller architecture suitable for use in an automated or partially automated vehicle control system that supports platooning.

The architecture and design of control systems suitable for implementing vehicle platooning may vary widely. The specific controller design can vary based on the level of automation contemplated for the controller, as well as the nature of and equipment available on the host vehicles participating in the platoon. By way of example, FIG. 1 diagrammatically illustrates a vehicle control architecture that is suitable for use with platooning tractor-trailer trucks. The specific controller illustrated is primarily designed for use in conjunction with a platooning system in which both vehicles include an active driver. The driver of the lead vehicle being fully responsible for control of the front vehicle. The a driver of the trailing vehicle is responsible for steering the trailing vehicle, but the platoon controller 110 is primarily responsible for controlling the engine torque of the trailing vehicles and braking requests during active platooning. However, it should be appreciated that generally similar control schemes can be used in systems which contemplate more automated control of one or both of the platoon partners.

In the illustrated embodiment illustrated in FIG. 1, a platoon controller 110, receives inputs from a number of sensors 130 on the tractor and/or one or more trailers or other connected units, and a number of actuators and actuator controllers 150 arranged to control operation of the tractor's powertrain and other vehicle systems. An actuator interface 160 may be provided to facilitate communications between the platoon controller 110 and the actuator controllers 150.

The platoon controller 110 also interacts with an inter-vehicle communications controller 170 which orchestrates communications with the platoon partner and a Network Operations Center (NOC) communications controller 180 that orchestrates communications with a NOC. The vehicle also preferably has selected configuration files 190 that include known information about the vehicle.

Some of the functional components of the platoon controller 110 include gap controller 112, a variety of estimators 114, one or more partner vehicle trackers 116 and various monitors 118. In many applications, the platoon controller 110 will include a variety of other components 119 as well. Exemplary embodiments of the platoon controller 110 and gap controller 112 are described in more detail below with reference to FIGS. 2 and 3.

Some of the sensors utilized by the platoon controller 110 may include GNSS (GPS) unit 131, wheel speed sensors 132, inertial measurement devices 134, radar unit 137, LIDAR unit 138, cameras 139, accelerator pedal position sensor 141, steering wheel position sensor 142, brake pedal position sensor 143, and various accelerometers 144. Of course, not all of these sensors will be available on all vehicles involved in a platoon and not all of these sensors are required in any particular embodiment. A variety of other sensor 149 (now existing or later developed or commercially deployed) may be additionally or alternatively be utilized by the platoon controller in other embodiments. In the primary embodiments described herein, GPS position data is used. However, GPS is just one of the currently available global navigation satellite systems (GNSS). Therefore, it should be appreciated that data from any other GNSS system or from other suitable position sensing systems may be used in place of, or in addition to, the GPS system.

Many (but not all) of the described sensors, including wheel speed sensors, 132, radar unit 137, accelerator pedal position sensor 141, steering wheel position sensor 142, brake pedal position sensor 143, and accelerometer 144 are relatively standard equipment on newer trucks (tractors) used to pull semi-trailers. However, others, such as the GNSS unit 131 and LIDAR unit 138 (if used) are not currently standard equipment on such tractors or may not be present on a particular vehicle and may be installed as needed or desired to help support platooning.

Some of the vehicle actuators controllers 150 that the platoon controller may direct at least in part include engine torque controller 152 (which is often part of the integrated functionality of an engine control unit (ECU) or powertrain control module (PCM)), transmission controller 154, brake controller 156, steering controller 157 (when automated steering is provided); and clutch controller 158. Of course, not all of these actuator controllers will be available or are required in any particular embodiment and it may be desirable to interface with a variety of other vehicle actuator controllers 159 that may be available on the controlled vehicle as well. Therefore, it should be appreciated that the specific actuator controllers 150 directed or otherwise utilized by the platoon controller on any particular controlled vehicle may vary widely. Further, the capabilities of any particular actuator controller (e.g. engine torque controller 152), as well as its interface (e.g., the nature and format of the commands, instructions, requests and messages it can handle or generate) will often vary with the make and model of that particular actuator controller. Therefore, an actuator interface 160 is preferably provided to translate requests, commands, messages and instructions from the platoon controller 110 into formats that are appropriate for the specific actuator controller hardware and software utilized on the controlled vehicle. The actuator interface 160 also provides a mechanism for communicating/translating messages, commands, instructions and requests received from the various actuator controllers back to the platoon controller 110. Typically an appropriate actuator interface would be provided to interact with each of the specific vehicle controllers utilized. In various embodiments, this may include one or more of an engine torque interface 161, a brake interface 162, a transmission interface 164, a retarder interface 165 (if a separate retarder controller is used), a steering interface 167, and/or any other appropriate controller interface 169.

Large trucks and other heavy vehicles frequently have multiple systems for "braking" the truck. These include the traditional brake system assemblies mounted in the wheels of the vehicle—which are often referred to in the industry as the "foundation brakes." Most large trucks/heavy vehicles also have a mechanism referred to as a "retarder" that is used to augment the foundation brakes and serve as an alternative mechanism for slowing the vehicle or to help prevent the vehicle from accelerating down a hill. Often, the retarder will be controlled by the engine torque controller 152 and in such embodiments, the retarder can be controlled by sending appropriate torque commands (which may be negative) to the engine torque controller 152. In other embodiments a separate retarder controller (not shown) may be accessible to, and therefore directed by, platoon controller 110 through an appropriate retarder interface 165. In still other embodiments, the platoon controller 110 may separately determine a retard command that it sends to the actuator interface 160. In such embodiments the actuator interface will interpret the retard command and pass on appropriate retardation control commands to the ECU or other appropriate vehicle controller.

The communications between vehicles may be directed over any suitable channel and may be coordinated by inter-vehicle communications controller 170. By way of example, the Dedicated Short Range Communications (DSRC) protocol (e.g. the IEEE 802.11p protocol), which is a two-way short to medium range wireless communications technology that has been developed for vehicle to vehicle communications, works well. Of course other communications protocols and channels may be used in addition to or in place of a DSRC link. For example, the inter vehicle communications may additionally or alternatively be transmitted over a cellular communications channel such as 4G LTE Direct, 5G, a Citizen's Band (CB) Radio channel, one or more General Mobile Radio Service (GMRS) bands, and one or more Family Radio Service (FRS) bands or any other now existing or later developed communications channels using any suitable communication protocol.

In various embodiments, the transmitted information may include the current commands generated by the platoon controller 110 such as requested/commanded engine torque 280, requested/commanded braking deceleration 282. They may also include steering commands, gear commands, etc. when those aspects are controlled by platoon controller 110. Corresponding information is received from the partner vehicle, regardless of whether those commands are generated by a platoon controller or other suitable controller on the partner vehicle (e.g., an adaptive cruise control system (ACC) or a collision mitigation system (CMS)), or through other or more traditional mechanisms—as for example, in response to driver inputs (e.g., accelerator pedal position, brake position, steering wheel position, etc.).

In many embodiments, much or all of the tractor sensor information provided to platoon controller 110 is also transmitted to the platoon partner and corresponding information is received from the platoon partner so that the platoon controllers 110 on each vehicle can develop an accurate model of what the partner vehicle is doing. The same is true for any other relevant information that is provided to the platoon controller, including any vehicle configuration information 190 that is relevant to the platoon controller. It should be appreciated that the specific information transmitted may vary widely based on the requirements of the platoon controllers 110, the sensors and actuators available on the respective vehicles, and the specific knowledge that each vehicle may have about itself.

The information transmitted between vehicles may also include information about intended future actions. For example, if the lead vehicle knows it approaching a hill, it may expect to increase its torque request (or decrease its torque request in the context of a downhill) in the near future and that information can be conveyed to a trailing vehicle for use as appropriate by the platoon controller 110. Of course, there is a wide variety of other information that can be used to foresee future torque or braking requests and that information can be conveyed in a variety of different forms. In some embodiments, the nature of the expected events themselves can be indicated (e.g., a hill, or curve or exit is approaching) together with the expected timing of such events. In other embodiments, the intended future actions can be reported in the context of expected control commands such as the expected torques and/or other control parameters and the timing at which such changes are expected. Of course, there are a wide variety of different types of expected events that may be relevant to the platoon control.

The communications between the vehicles and the NOC may be transmitted over a variety of different networks, such as the cellular network, various Wi-Fi networks, satellite communications networks and/or any of a variety of other networks as appropriate. The communications with the NOC may be coordinated by NOC communications controller 180. The information transmitted to and/or received from the NOC may vary widely based on the overall system design. In some circumstances, the NOC may provide specific control parameters such as a target gap tolerance. These control parameters or constraints may be based on factors known at the NOC such as speed limits, the nature of the road/terrain (e.g., hilly vs. flat, winding vs. straight, etc.) weather conditions, traffic or road conditions, etc. In other circumstances the NOC may provide information such information to the platoon controller. The NOC may also provide information about the partner vehicle including its configuration information and any known relevant information about its current operational state such as weight, trailer length, etc.

The configuration file 190 may include a wide variety of information about the host vehicle that may be considered relevant to the controller. By way of example, some of the information might include the vehicle's specification including such things as engine performance characteristics, available sensors, the nature of its braking system, the location of its GNSS antenna relative to the front of the cab, gear ratios, differential ratios etc.

Figure 2:
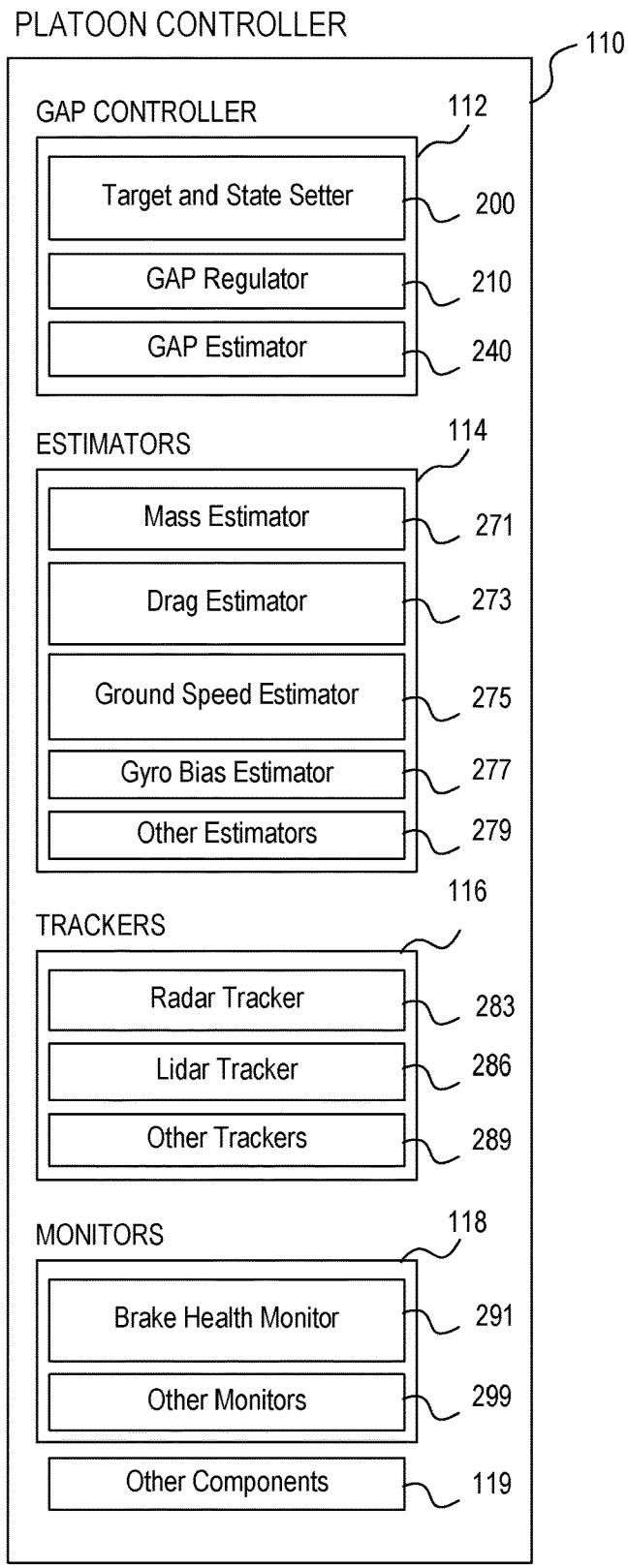
FIG. 2 is a block diagram of a representative platoon controller architecture suitable for use in the automated or partially automated vehicle control system of FIG. 1.

FIG. 2 illustrates a particular embodiment of a platoon controller 110. In the illustrated embodiment, the platoon controller 110 includes a gap controller 112, a plurality of estimators 114, one or more trackers 116, any desired monitors 118 and potentially any of a variety of other components 119.

In the illustrated embodiment, the gap controller 112 includes a target and state setter 200, a gap regulator 210 and a gap estimator 240. In general, the target and state setter 200 is arranged to determine the intended operational mode (state) of the gap regulator 210 and the values of any variable control parameters that are appropriate for use in that operational mode.

The gap regulator 210 is arranged to control the trailing platoon partner in the manner designated by the target and state setter 200. In the gap control operational mode, the gap regulator 210 controls the vehicle in a manner that seeks to attain and maintain the desired gap in accordance with any designated control parameters specified by the state setter 200. In other modes, the gap regulator 210 controls the vehicle in a manner that seeks to attain the appropriate response for the selected operational mode.

The gap estimator 240 is arranged to estimate/determine the current gap based on actual measurements and/or other information that is available to the platoon controller 110. It should be apparent that an accurate understanding of the current gap is important to successful operation of the gap regulator. At the same time, it should be appreciated that any measurement system has inherent tolerances and can be subject to reporting errors and/or may become unavailable in some circumstances. Thus, the gap estimator 240 is configured to receive information from multiple position or relative position related sensors and to fuse such data into a reliable estimate of the current gap.

The torque and braking requests generated by GAP regulator 210 are sent to the appropriate actuator interface (e.g., engine torque interface 161 and brake interface 162 respectively). The engine torque interface 161 then forwards an appropriate torque command to engine torque controller 152 which directs the delivery of the requested torque by directing various engine operating parameters such as fuel charge, valve timing, retarder state, etc. appropriately. The brake interface 162 generates an appropriate brake request that is sent to the brake controller 156.

A particular embodiment of gap controller 112 is described in more detail below with reference to FIG. 3.

Returning to FIG. 2, there are a variety of estimators 114 that are useful for the gap controller 112. In various embodiments these may include one or more of a mass estimator 271, a drag estimator 273, a ground speed estimator 275, a gyro bias estimator 277 and/or other estimators 279.

The mass estimator 271 is arranged to estimate the respective masses of the platoon partners. These mass estimations may be used by the gap controller 112 to help scale its torque and brake requests appropriately based on the respective weights (masses) of the platoon partners.

The drag estimator 273 is arranged to estimate the respective drag resistances of the platoon partners. These drag resistance estimates may also be used by the gap controller to help adjust its torque and brake requests appropriately. In general, the drag resistance of any particular truck or other vehicle can vary based on a variety of factors including: (a) its drag profile (which in the context of a truck may change based on the trailer being pulled—if any, or other characteristics of the load); (b) the vehicle's current speed, (c) wind speed and direction, (d) rolling resistance, (e) platoon state (e.g., whether a platoon is active, the position of the vehicle within the platoon, the gap), (f) bearing wear, etc.

The ground speed estimator 275 is arranged to estimate the actual ground speed of the respective platoon partners. Many trucks and other vehicles have wheel speed sensors that can quite accurately measure the rotational speed of the associated wheels. The actual ground speed may differ from measured wheel speed based on the respective diameters of the wheels and slip conditions of the tires. The precise diameter of the wheels can vary based on the tires used. Furthermore, the diameter of the wheels will vary over time with tire wear, changes in ambient temperature and other factors. The wheel diameter will even change over the course of a particular trip as the tires heat up (or otherwise change in temperature) during use. In practice, all of these variations in wheel diameter are potentially significant enough to impact the gap estimation and gap control. Therefore, the ground speed estimator 275 is arranged to estimate the actual ground speed based on measured wheel speed and other available information such as GNSS information. The ground speed estimates are particularly useful in times when tracker based gap measurements (e.g., radar, cameras, LIDAR, etc.) aren't available—which may occur, for example, when the platoon partners are laterally offset due to a lane change, etc.

Several of the measurements utilized by the gap controller 112 are inertial measurements that are gyro based. These may include yaw measurements which indicate the rate at which the associated vehicle is turning, longitudinal acceleration measurements, etc. Gyros often have an inherent measurement error referred to as a gyro bias that can affect measurements. The gyro bias estimator 277 estimates such biases to allow the gap controller to compensate for such gyro based measurement errors.

The platoon controller 110 can include any other estimators 279 that may be useful to any particular gap controller 112 as well.

The platoon controller 110 may also include one or more trackers 116. Each tracker 116 is arranged to measure or otherwise determine the gap. One type of tracker that is used in many implementations is a radar based radar tracker 283. Newer commercially available trucks often come equipped with a radar unit as standard equipment and radar trackers are particularly well suited for use in such vehicles. Of course, one or more radar units may be installed on any vehicle that does not come pre-equipped with a radar unit to facilitate use of radar tracker 283. By way of example, some specific radar trackers are described in more detail in co-pending U.S. application Ser. Nos. 15/590,715 and 15/590,803, both filed May 9, 2017, both of which are incorporated herein by reference.

LIDAR is another distance measuring technology that is well suited for measuring the gap between vehicles. LIDAR is quickly gaining popularity for use in automated and autonomous driving applications. LIDAR tracker 286 is well suited for use on vehicles that have or are provided with LIDAR units. Cameras and stereo cameras are also becoming more popular distance measuring tools for use in various automated and autonomous driving applications.

Of course, other distance measuring technologies can be used to measure or estimate the gap between vehicles as represented by other trackers 289. By way of example, a GPS tracker could be used that is based primarily on the respective reported GPS positions of the vehicles.

The tracker(s) used in many embodiments are configured to fuse data from multiple sensors to help validate the measurements of the primary sensors used by the respective trackers. The aforementioned radar tracker application describes a variety of methods for fusing data to help validate measurements of a primary sensor in that manner.

In various embodiments, the gap estimator 240 could replace or be replaced by one or more of the trackers, or could be thought of as a tracker itself since it determines/estimates the gap based on inputs from multiple sensors. In the illustrated embodiment, the gap estimator 240 is shown separately as part of gap controller 112 since it fuses distance data from the tracker(s) and any other available sources such as GNSS sensors on each of the vehicles.

The platoon controller 110 may also include one or more monitors 118 that are configured to monitor specific components that are relevant to gap control. By way of example, one specific monitor that is particularly useful to the control of platooning trucks is brake health monitor 291. The brake health monitor 291 is configured to monitor the brake system and to identify circumstances in which the brakes may not be able to deliver the level of braking normally expected for platoon control—as for example could occur if the foundation brakes include drum brakes that have been used while traveling downhill in the mountains to the extent that they are close to overheating. If the brake health monitor 291 identifies such a circumstance, it informs the platoon controller, which can take the appropriate remedial action. The appropriate remedial action will vary based on the specific circumstances identified by the brake health monitor, but may include, for example, actions such as dissolving the platoon, increasing the target gap to a level more appropriate for the brake conditions, etc. Of course, the brake health monitor can also configured to identify circumstances in which the condition of the brakes has improved (e.g., the brakes have cooled sufficiently) and inform the platoon controller of those circumstances as well so that the platoon controller can act accordingly. For example, improved braking status may allow the target gap to be reduced, a platoon to be reestablished or other appropriate actions.

The platoon controller may include any of a variety of other monitors 299 that are configured to monitor the state or status of other components, systems, environmental conditions, road or traffic conditions, etc. that may be relevant to platoon control. For example, a DSRC link monitor may be provided to monitor the status of a DSRC communication link between the platoon partners.

Figure 3:
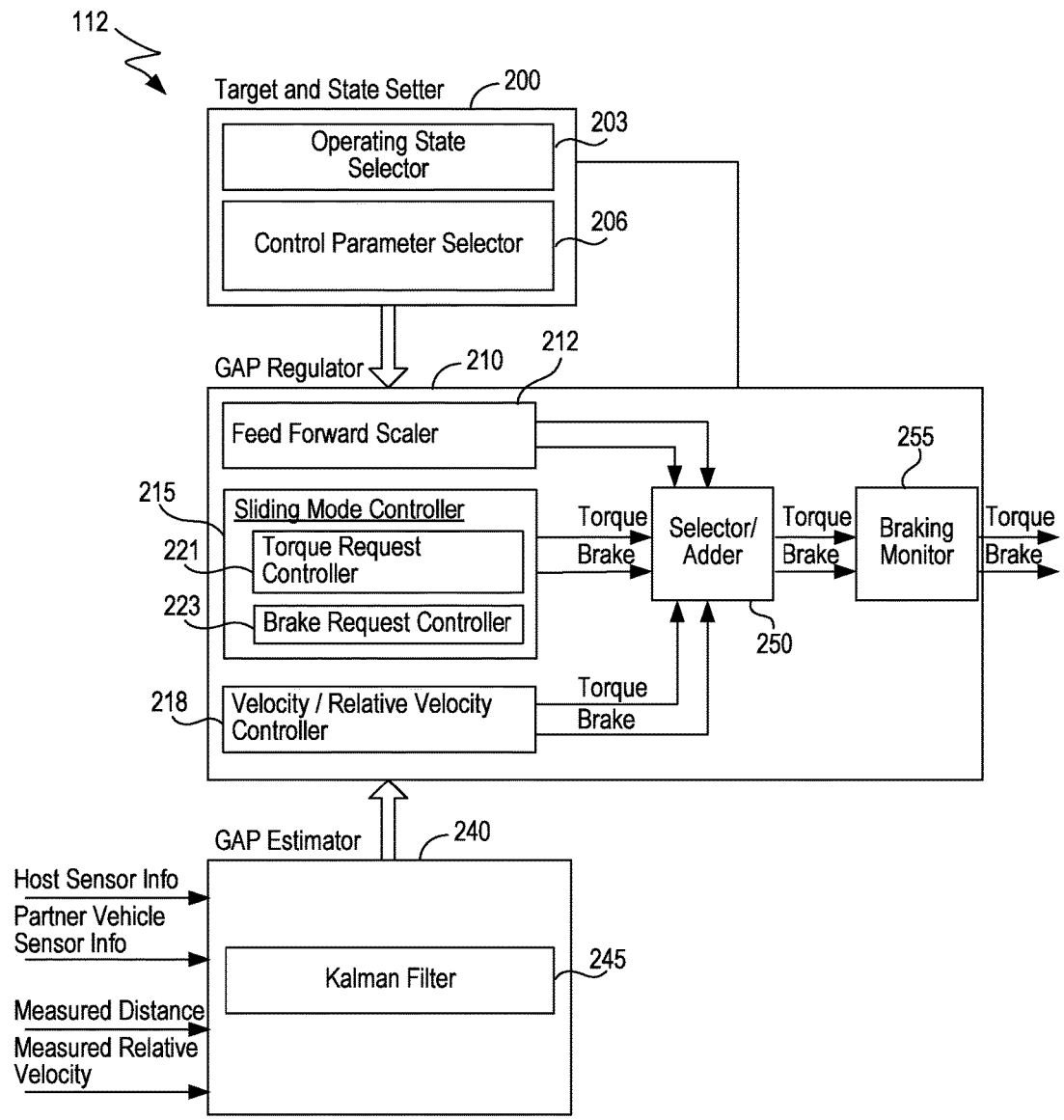
FIG. 3 is a block diagram of a gap controller in accordance with one embodiment.

Referring next to FIG. 3, another embodiment of gap controller 112 will be described in more detail. Similarly to the embodiment illustrated in FIG. 2, the gap controller 112 includes a target and state setter 200, a gap regulator 210 and a gap estimator 240. In the embodiment of FIG. 3, the target and state setter 200 includes an operating state selector 203, and a control parameter selector 206 that determines, selects, sets or otherwise indicates to the gap regulator the values of any variable control parameters that are appropriate for use in the selected operational mode.

The operating state selector 203 is arranged to determine the intended operational mode (state) of the gap regulator 210. In some specific embodiments, the operational modes might include a "normal" or "gap control" operational mode in which the gap regulator is configured to control towards attaining an maintaining a designated gap between the vehicles. In the gap control operational mode control parameter variables dictated by the control parameter selector might include the target gap itself (e.g. 10 m, 12 m, etc.)—which may vary somewhat based on driving conditions (e.g., weather, terrain, road conditions, traffic, etc.). Other control parameters during normal operation may include parameters that impact the draw-in speed, the tightness of the control, tolerances or variations between torque control and braking control, etc. In other embodiments, "initiate platoon" and/or "draw-in" or "pull-in" may be one or more separate states that are used to establish a platoon and/or to bring the platoon partners together in a safe manner under at least partially automated control.

Another potential operational mode is a "dissolve" mode in which the platoon controller transitions the trailing vehicle toward/to a position at which the driver of the trailing vehicle (or an automatic cruise control system) can safely take over control of the vehicle. Generally, dissolving a platoon includes increasing the gap between the vehicles in a controlled manner to/towards a point at which the platoon can be dissolved and vehicle control can be safely transferred to manual control by the driver or to control through the use of a different system such as adaptive cruise control. The dissolve mode may optionally be triggered by a wide variety of different circumstances, as for example, in response to one of the platoon partners or the NOC deciding to terminate the platoon; the detection of a car cutting-in between the platooning vehicles; the loss of communications between the vehicles for an extended period; the detection of an object in front of the lead vehicle that is too slow or too close to the platoon; etc.

Another potential operational mode may be a velocity control or relative velocity control mode. Velocity control, or relative velocity control may be preferable to trying to control to maintain a particular gap in a variety of specific circumstances—as for example when the trailing vehicle's radar (or other) tracking unit loses sight of the partner vehicle, as can occur when there is a lateral offset between the vehicles due to a lane change or other conditions.

Of course, there can be a variety of other operational modes as well.

The gap regulator 210 is arranged to control the trailing platoon partner in the manner designated by the target and state setter 200. In the embodiment illustrated in FIG. 3, the gap regulator 210 includes a scaler 212 and two separate controllers which are used in different combinations in different operating modes. In the illustrated embodiment, the controllers include a sliding mode controller 215 (which performs gap control) and a velocity/relative velocity controller 218. It should be appreciated that in other embodiments, a single controller, additional and/or different may be provided as appropriate for any particular implementation.

In the illustrated embodiment, the feed forward scaler 212 is configured to scale the torque and brake signals from the front vehicle before adding them to the outputs from the sliding mode and relative velocity controllers 215, 218 to create the torque and brake request to the engine and brake controllers. Such scaling may be based on factors such as the respective weights (masses) of the platoon partners, the respective drags of the vehicles, the severity of a braking event (e.g., in high braking scenarios, the braking command may be increased a bit to provide a margin of safety to account for uncertainties in braking performance and reactions times), etc. In other embodiments, such scaling functions can be integrated into the respective controllers themselves if desired.

The sliding mode controller 215 is configured to control the trailing vehicle in a manner that seeks to attain and maintain the desired gap in accordance with the target gap and any other control parameters specified by the control parameter selector 206. Thus, its primary function is gap control. The velocity controller 218 is configured to control the trailing vehicles in a manner that maintains a designated velocity relative to the lead vehicle, or in some circumstances, simply a designated velocity. In the illustrated embodiment, these two separate controllers are provided so that the gap regulator 210 can provide different types of control, as may be appropriate in different operational circumstances. A few specific examples are described with reference to FIGS. 4A-4C. In the described embodiments, both the controllers 215 and 218 are operated continuously during platooning and the selector/adder 250 is used to select the appropriate signals to output based on the current operating mode. An optional braking monitor 255 is a safety feature that may be utilized to help ensure that the brake commands outputted by selector/adder 250 don't overly aggressively brake the trailing vehicle except in where necessary from a safety/crash prevention standpoint. This is to reduce the risk of traffic behind the trailing platoon partner from being impacted by unexpected aggressive braking of the trailing platoon partner.

Figure 5:
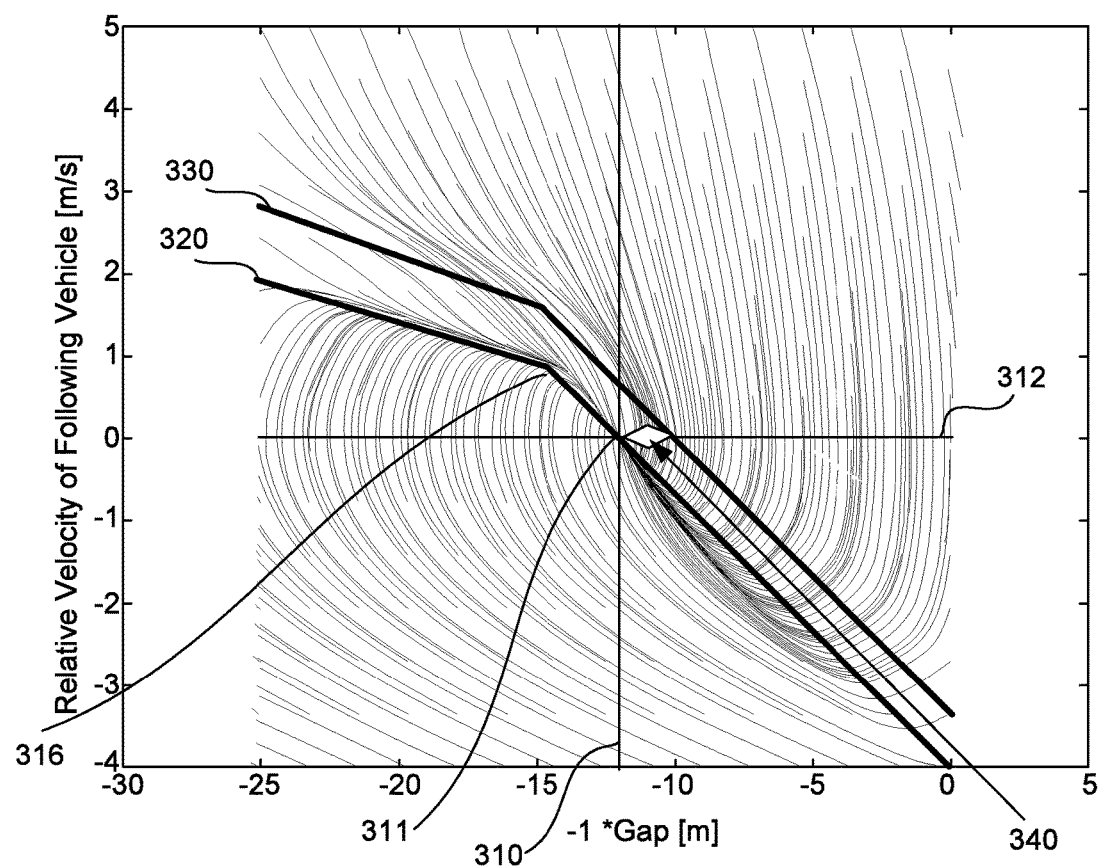
FIG. 5 is a state space diagram illustrating a sliding mode control scheme.

The sliding mode controller 215 is arranged to control the trailing vehicle in a manner such that its relative velocity relative to the front vehicle varies as a function of the gap between the vehicles. This characteristic is illustrated in the state space diagrams of FIG. 5 which show a control scheme in accordance with one specific implementation. More specifically, FIG. 5 plots relative velocity between the vehicles (the Y-axis) vs. gap between the vehicles (the X-axis). FIG. 5 also show a torque request controller target control line 320. In the illustrated embodiment, the nominal desired gap is 12 meters—which is represented by line 310. Thus, the target control point 311 is 12 meters with zero relative velocity, which is the point represented by the intersection of line 310 (12 meters gap) and line 312 (zero relative velocity).

The torque request controller component 221 of gap regulator 210 is configured to generate a torque request that is appropriate to control the gap in accordance with target control line 320. The torque request is then implemented by engine torque controller 152. As can be seen in FIG. 5, when the gap is larger than the desired gap, the rear truck is controlled to travel slightly faster than the front truck is traveling such that the relative velocity of the rear truck has a small positive value. As the rear truck draws closer to the lead truck, its relative velocity is reduced in a smooth manner until the gap is reduced to the target control point 311, at which point the relative velocity would be zero if perfect control were attained. If the rear truck gets closer than the desired gap, it is slowed so that it has a negative relative velocity relative to the lead truck to reestablish the desired gap.

The sliding mode controller 215 utilizes a unified sliding mode control scheme during both the "pull-in" and gap maintenance stages of platooning. Configuring the sliding mode controller to control towards target control line 320 helps ensure that the relative speed vs. gap relationship stays within a region safe for platooning.

In the embodiment illustrated in FIG. 3, the sliding mode controller 215 includes separate controllers (e.g. torque request controller 221 and brake request generator components 223) which are configured to control towards different gap control targets. The different control targets are illustrated in the state space diagrams of FIG. 5 which show a control scheme in accordance with one specific implementation. More specifically, FIG. 5 shows a brake request controller target control line 330 in addition to torque request controller target control line 320. FIG. 5 additionally shows representative transition paths from various points in the state space to the torque request target control line 320.

For most open highway driving conditions, modulating the torque request alone is sufficient to control the gap appropriately without requiring the use of the foundation brakes. This is in part because the torque request can be negative to a certain degree without needing to actuate the foundation brakes through the use of engine braking and/or the retarder (if available). As mentioned above, when fuel is cut-off there will be some pumping losses and some frictional losses in the powertrain, so some level of negative torque can be provided while using normal valve timing by simply reducing the fuel charge appropriately. When larger negative torque is needed, the engine torque controller 152 can create larger negative torques by actuating the retarder and/or by taking other appropriate measures.

Separately, the brake request controller component 223 of gap regulator 210 is arranged to generate brake requests during normal operation that are generally arranged to maintain a different gap—specifically a smaller gap—than the torque request controller 221 targets. This difference in the gaps that the torque and brake request controllers control to is sometimes referred to herein as the gap tolerance 340. In general, brake requests 213 are not generated unless or until the gap is reduced at least the gap tolerance below the torque request target control line 320. Since the brakes can only be used to slow the vehicle, the effect of this difference is that the trailing truck will be allowed to creep in a relatively small amount (2 meters in the example) before the foundation brakes are actuated when the gap regulator 210 cannot maintain the desired gap through control of the torque request alone. When the desired gap can be restored by modulating the torque requests alone without crossing target brake control line 330, then the foundation brakes do not need to be used at all. This has the effect of safely maintaining a gap while reducing the probability that the foundation brakes will be deployed unnecessarily.

Figure 4A:
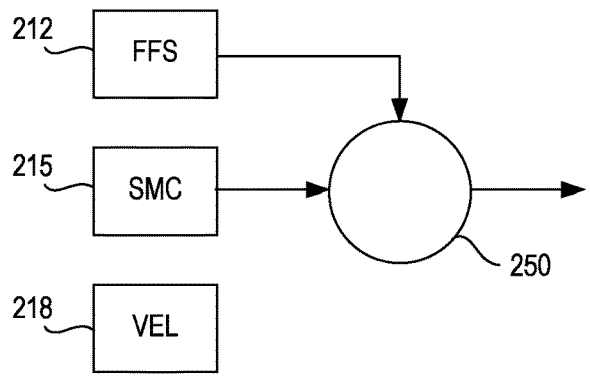
FIGS. 4A-4C are a series of diagrams illustrating different control states used by a gap regulator in accordance with one embodiment during different operational states.

Normal gap control is illustrated in FIG. 4A. During normal gap control, the sliding mode controller 215 is use to determine torque and brake requests that are appropriate to attain and maintain the target gap set by control parameter selector 206. When appropriate, the torque and brake requests generated by the sliding mode controller 215 may be scaled appropriately by selector/adder 250 based on inputs from feed forward scaler 212. In this normal gap control mode, the outputs of the relative velocity controller 218 are not used in the control of the trailing vehicle.

In some embodiments, the sliding mode controller 215 includes separate torque request and brake request controllers 221, 223 as illustrated in FIG. 3. The torque request and brake request controllers 221, 223 are configured to control the engine and brakes respectively towards different gap targets which tends to provide a smoother, more comfortable ride and reduce the use of wheel brakes (e.g., the foundation brakes in tractor-trailer rigs) compared to control in which the engine and brakes are controlled to the same target gap. Such a gap control architecture is described in more detail in U.S. Provisional application No. 62/489,662, which is incorporated herein by reference.

Although the sliding mode controller 215 works very well to control the gap, there will be operational circumstances in which different types of control may be appropriate. For example, a different type of control may be desirable when it is necessary to dissolve a platoon and return the trailing vehicle to manual or other automated control. Typically, the gap between vehicles during platooning will be smaller, often much smaller, than can safely be maintained by a driver under manual control. Therefore, in general, when a platoon is dissolved with the intent to restoring manual control of the trailing vehicle, it will be desirable to grow the gap to a distance that is appropriate for manual control before relinquishing control to the driver. This can be accomplished in a smooth manner by relative velocity controller 218.

Figure 4B:
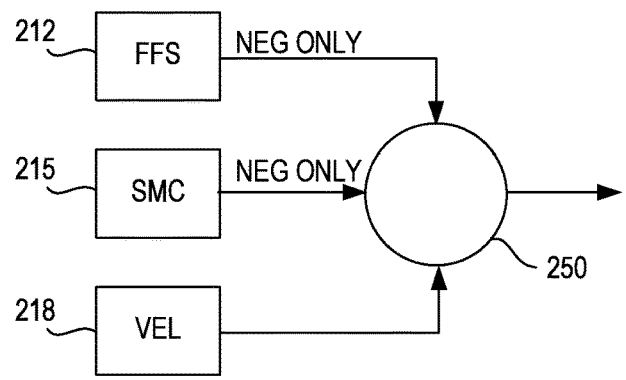

When operating state selector 203 determines that the platoon should be dissolved, it directs the GAP regulator 210 to transition to a dissolve mode as represented by FIG. 4B. In the dissolve mode, primary control is provided by relative velocity controller 218. The control parameter selector 206 may designate a desired (target) relative velocity for the trailing truck during the dissolve. The specific target relative velocity may vary based on the nature of the circumstances and/or the vehicles involved in the platoon. In general, it is desirable to select a relative velocity that will cause the vehicles to gradually, but expeditiously separate, without requiring the trailing vehicle to slow excessively (which could unduly hinder following traffic) and preferably without requiring the lead vehicle to alter its drive plan. By way of example, relative velocities during dissolves on the order of 0.5 to 4 meters per second, as for example, 1-2 m/s, have been found to work well in the context of platooning trucks.

During a dissolve, the lead vehicle may take a variety of actions. For example, the lead truck may accelerate or increase its torque command aggressively. In such cases, it may not be desirable to try to accelerate the trailing truck in a similar manner thereby allowing the lead vehicle to pull away more than would otherwise occur under relative velocity control. One way to accomplish this in the context of platooning trucks is to ignore or otherwise disable positive torque commands from feed forward scaler 212.

Another potential scenario is that the lead truck brakes or slows significantly while under velocity control. In some circumstances, the velocity controller 218 may be configured to permit a certain amount of gap shrinkage when the gap is relatively larger to thereby reduce the overall amount of braking required. In the illustrated embodiment, the sliding mode controller is configured to ensure that the gap between the vehicles is always sufficient to give the trailing vehicle sufficient time to respond in a manner that prevents the trailing vehicle from running into the back of the lead vehicle regardless of the occurrence of (reasonable) unexpected events. Therefore, if the sliding mode controller is outputting a braking or negative torque signal that has a greater magnitude than the relative velocity controller, then that larger braking/negative torque command should be passed to the vehicle's engine and braking controllers. Therefore, during a dissolve, the selector/adder 250 is configured to only utilize negative commands (i.e., braking commands and negative torque commands) from the sliding mode controller 215 and to only use such commands when they are greater in magnitude than the commands from the relative velocity controller 218.

There may also be operational circumstances outside of dissolves in which relative velocity control or simply velocity control is desired. For example, there may be circumstances in which the back of the lead vehicle moves out of view of the trailing vehicle's tracker(s) 116 or the tracker(s) 116 otherwise loses sight of the back of the platoon partner. This can occur, for example, as a result of a lane change by one of the platoon partners. In such a circumstance the gap regulator may not have an accurate measure of the longitudinal gap between the vehicles—and may have to rely on less accurate approaches for determining the gap such as the vehicle's respective GNSS positions. In such circumstances, it may be desirable to control the trailing vehicle to slowly drop back until the back of the lead vehicle comes within the tracker's view. Again, the relative velocity controller 218 is well suited for use in this circumstance—although the preferred relative velocity control may be a bit different than occurs during a dissolve. Specifically, the goal is typically not to drop back as quickly or as far as would occur during a dissolve—thus a smaller relative velocity (e.g. 0.5 m/s vs. 2 m/s), may be appropriate.

Figure 4C:
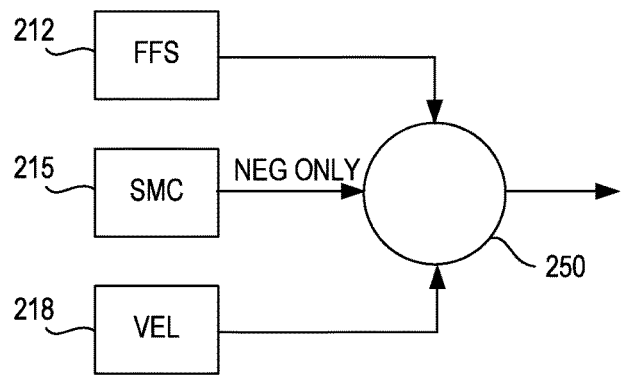

One approach to such relative velocity control is illustrated in FIG. 4C. In the velocity control scheme of FIG. 4C velocity controller 218 is used in conjunction with normal scaling from feed forward scaler 212. This causes the trailing platoon partner to better follow lead vehicle accelerations and/or torque increases than occurs during the dissolve state illustrated in FIG. 4B. At the same time, for safety purposes, braking requests and negative torque request from the sliding mode controller 215 may be utilized as appropriate by selector/adder 250 in a manner similar to the approach described above with respect to FIG. 4B.

Although particular platoon and gap controller architectures are illustrated in FIGS. 2 and 3, it should be appreciated that the specific architectures utilized may vary widely to meet the needs of any particular platooning or other automated vehicle control scheme.

As will be apparent to those familiar with the art, the described controllers can be implemented algorithmically using software or firmware algorithms executing on one or more processors, using programmable logic, using digital or analog components or using any combination of the preceding.

In the detailed description above, it is assumed that the controlled power plant is an internal combustion engine, as for example a diesel engine. However, it should be appreciated that the described control approach can be utilized regardless of the nature of the power plant used to provide torque to drive the host vehicle. Thus, the described controller design, functionalities and architectures may generally be applied to the control of vehicles that utilize electric motors, turbines, fuel cells, or other types of powerplants to provide power to a drivetrain or directly to one or more wheels, including hybrids which combine more than one type of powerplant (e.g., hybrids that incorporate both an electric motor and an internal combustion engine). When the power plant is or includes an internal combustion engine, any type of internal combustion engine may be used including gas powered engines, diesel powered engines, two-stroke engines, 4-stroke engines, variable stroke engines, engines utilizing more than four-strokes, rotary engines, turbine engines, etc.

The description above has focused primarily on tractor-trailer truck platooning applications, however, it should be appreciated that the described control approach are well suited for use in a wide variety of connected vehicle applications, regardless of whether one or more of the vehicles involved have 2, 3, 4, 18 or any other number of wheels, and regardless of nature of the powerplants used in such vehicle.

Figure 6:
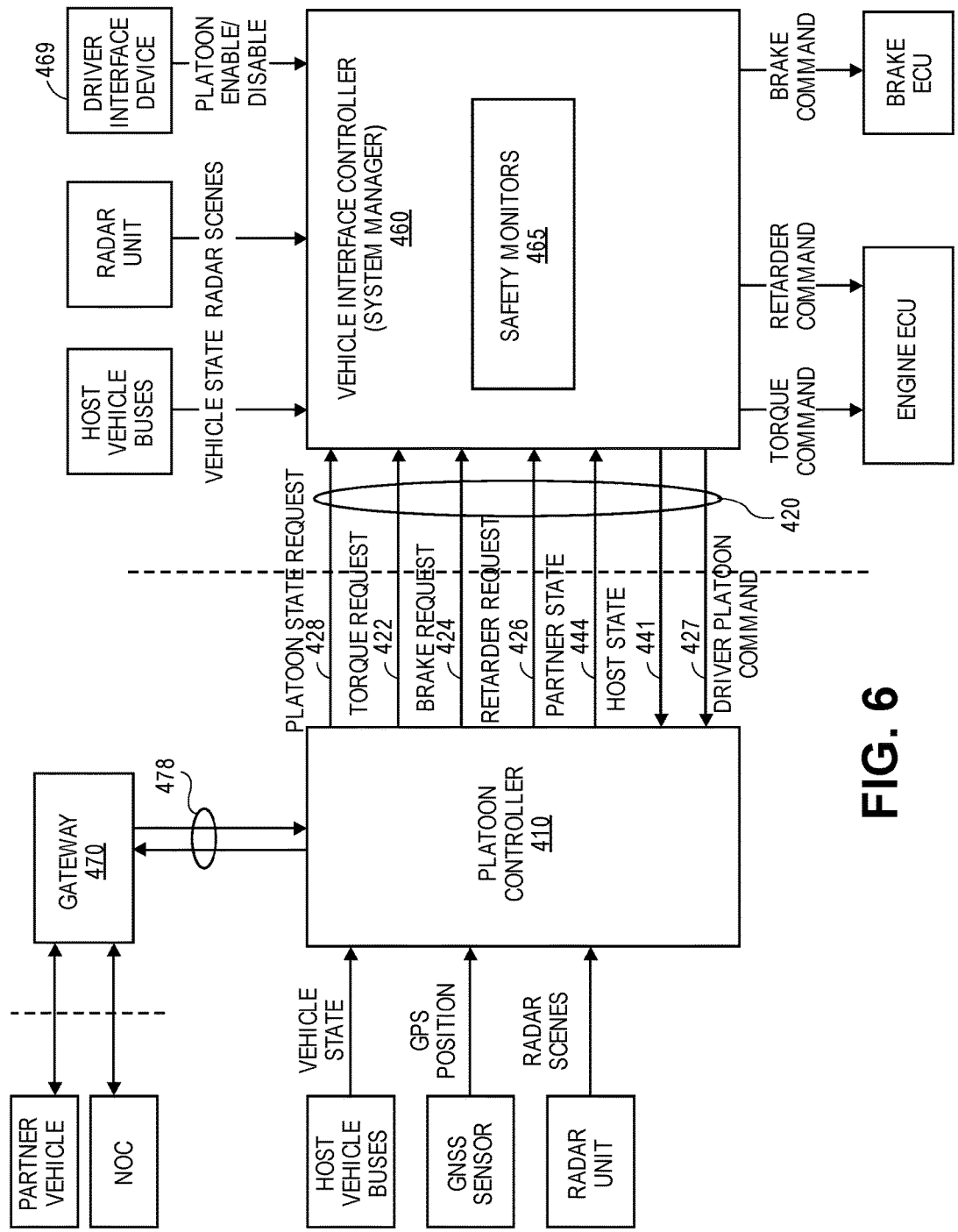
FIG. 6 is a specific ASIL compliant controller hardware architecture suitable for use in an automated or partially automated vehicle control system that supports platooning.
Figure 7:
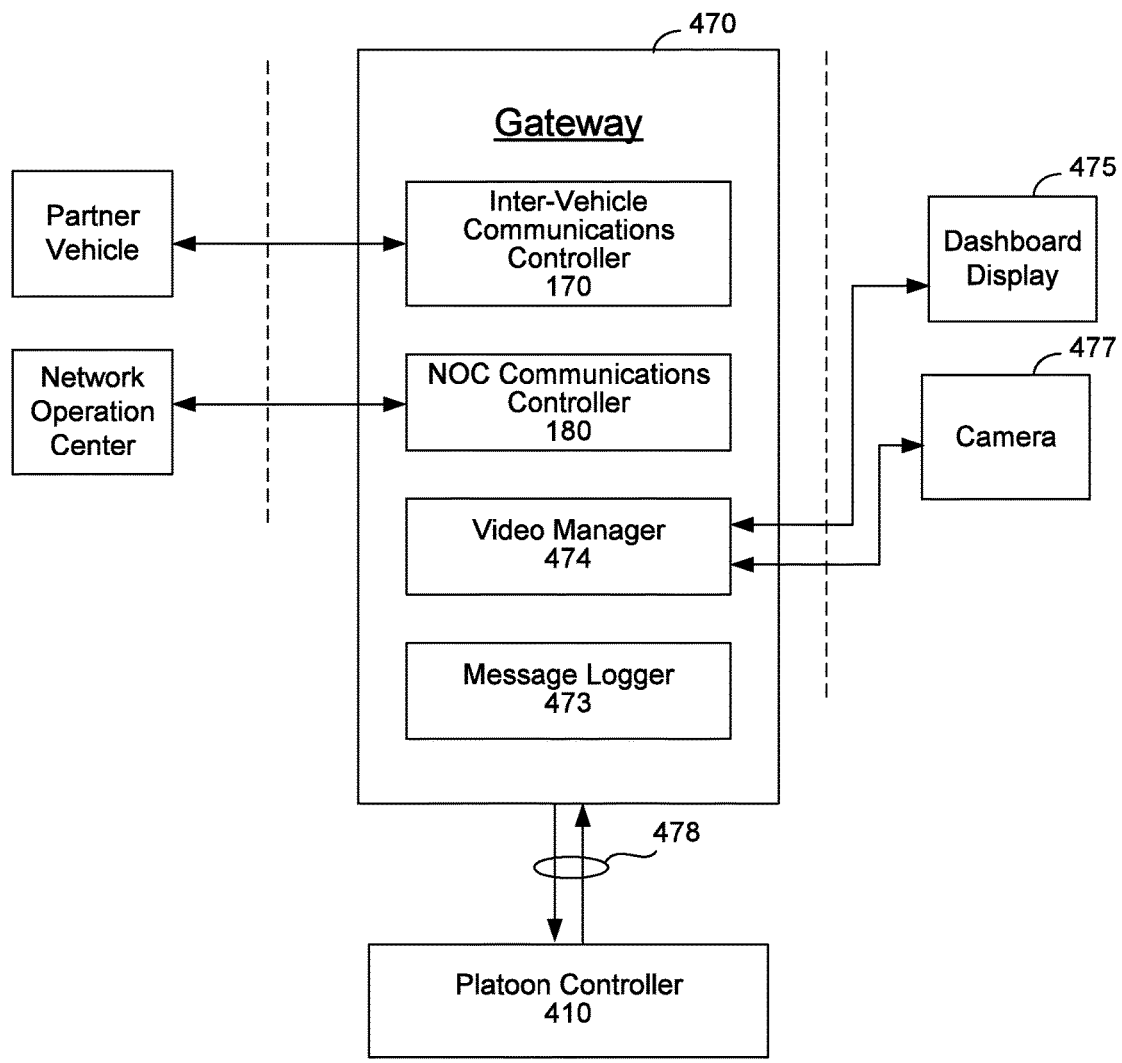
FIG. 7 illustrates components of a gateway in accordance with one embodiment.

FIG. 6 illustrates a platoon control system hardware architecture that is particularly well suited suitable for ASIL compliant platoon control. The illustrated embodiment includes three separate controller hardware units. These include platoon controller 410, vehicle interface controller 460 and gateway processor 470. Selected components of a representative gateway processor 470 are illustrated in FIG. 7

As best seen in FIG. 6, the platoon controller 410 communicates with the vehicle interface controller 460 through an interface 420 and with gateway 470 through a direct link 478. In some embodiments, the link 478 is a dedicated direct wired connection and no other devices are coupled to that link. The wired connection may be provided by any suitable form of cabling or traces, as for example co-ax cable, twisted pair wirings, fiber optics or any other suitable physical connection medium.

In the illustrated embodiment, the platoon controller 410 incorporates all of the functionality of platoon controller 110 described above. The vehicle interface controller 460 (also sometimes referred to as a system manager) performs the functionality of actuator interface 160 and further includes a number of safety monitors. In some embodiments, the safety monitors are arranged to execute ASIL compliant safety monitoring algorithms and the vehicle interface controller 460 is designed as an ASIL compliant device.

In general, the vehicle interface controller 460 includes a higher safety level processor and software (including the safety monitors) that independently verifies the commands transmitted by the platoon controller 110 before they are passed on to the vehicle actuators. These verifications use a subset of the available sensor inputs, together with verification algorithms that are independent and distinct from those used by the platoon controller.

The gateway processor 470 is arranged to coordinate communications between a host vehicle and the platoon partner(s) and to coordinate communication between the host and the Network Operations Center and/or any other entities that are external to the vehicle. As such, in a specific implementation of the system illustrated in FIG. 1 the gateway processor 470 includes the inter-vehicle communications controller 170 and NOC communication controller 180 as best illustrated in FIG. 7. Typically the inter-vehicle communications controller utilizes a short-range, vehicle-to-vehicle wireless communications protocol, as for example the DSRC protocol. The NOC communication controller typically communicates with a networks operations center using cellular or satellite communications.

In some embodiments, the connection (link 478) between the gateway processor 470 and the platoon controller 410 is a dedicated direct wired connection and no other devices are coupled to the link. In some implementations an Ethernet or similar standardized wired communications protocol is used to pass information between the gateway processor and the platoon controller. This facilitates high speed, high reliability communications between the gateway processor and the platoon controller. In a specific example, a 100BASE or higher (e.g. 1000BASE, 10 GBASE, etc.) Ethernet physical layer may be used, although it should be appreciated that a variety of other physical layers may be used in other embodiments.

In some embodiments, the gateway processor 470 is also arranged to communicate with a forward facing camera 477 mounted on the vehicle and a dashboard display 475. When the host vehicle is the lead vehicle in a platoon, the gateway processor transmits a video feed received from the forward facing camera 477 to the trailing vehicle(s) so that the driver of the trailing vehicle has a view of what is in front of the lead vehicle. When the host vehicle is a trailing vehicle in the platoon, the gateway processor 470 receives such a video feed from the gateway processor on the lead vehicle and transmits the feed to the dashboard display 475 where it is displayed to give the driver of the host vehicle a view of what is in front of the lead vehicle. Displaying a view of what is in front of the lead vehicle to drivers of a trailing vehicle is desirable to give the driver of the trailing vehicle a sense of comfort, better situational awareness and an ability to independently react to situations that occur in front of the platoon. This can be particularly important because in many platoons (e.g. platoons that involve tractor trailer trucks) the trailing vehicle will be very close to the lead vehicle (much closer than normal manual driving) and the lead vehicle will effectively block the view of the trailing vehicle which can be an uncomfortable experience for drivers and/or passengers in a trailing platoon partner—especially when they do not have access to a view of what is going on in front of the platoon.

The video streams passed through the gateway may be managed by a video manager 474. Since the gateway 470 communicates directly with the camera 477 and/or dashboard display 475, the platoon controller 410 is not in any way burdened by the need to manage that data flow.

In some embodiments the gateway 470 also includes a message logger 473 that logs various messages and other information passed there through in order to provide a record for diagnostic purposes and the like. The functionality of the message logger 473 will be described in more detail below.

The platoon controller 410 is configured as a listener on any appropriate vehicle communications buses where it can directly obtain information about the vehicle's operational state—such as the vehicle's current wheel speed, any brake or accelerator pedal inputs, steering wheel position (as appropriate), transmission gear, etc. It is also coupled to sensor units such as GPS unit 131 to receive positional information about the location of the vehicle, and to forward looking radar unit 137 to receive information about the position of objects outside the vehicle (e.g., radar scenes). Similar information may be obtained from other sensors as well, such as LIDAR 138, camera(s) 139 etc. Since the platoon controller 410 is configured strictly as a listener on the vehicle's communication bus(es) and does not itself transmit information over such bus(es), it does not need to be ASIL compliant, as long as the control commands it outputs to the vehicle interface controller are verified to ASIL standards by the vehicle interface controller 460.

The vehicle interface controller 460 (also sometimes referred to as the system manager 460), which is ASIL compliant, is arranged to send commands to, and otherwise communicate with, the vehicle's engine controller (EECU), the brake controller (B ECU), and/or any other appropriate controllers either directly or via one or more communications buses, such as the vehicle's CAN bus(es).

In the illustrated embodiment, the interface 420 between platoon controller 410 and vehicle interface controller 460 (also sometimes referred to as the system manager 460) is fairly narrowly defined. It includes the substantive commands generated by the platoon controller—which in the illustrated embodiment include torque request 422, brake request 424, and optionally a retarder request 426. When the platoon controller also controls the steering or other aspects of the host vehicle steering and/or other appropriate control commands (not shown) may be included as well.

The interface 420 also includes a platooning state indicator 428 that is a signal from the platoon controller indicating whether or not it believes that its output should be directing operation of the vehicle. The platooning state indicator 428 may take many forms, as for example a simple flag that when high indicates that the platoon controller 410 believes that platooning is/should be active and that its torque, braking and retard commands 422, 424, 426 should be followed. In such an arrangement, a low flag state indicates that the platoon controller believes that it is not controlling the vehicle. The vehicle interface controller 460 does not forward any torque, braking, retard or other control commands at any time that the platooning state indicator 428 indicates that platoon control is not active. In the event (generally unlikely) that one of the safety monitors 465 indicates that platooning is not appropriate when the platoon controller 410 believes that platooning is valid (as indicated by platooning state indicator 428), the vehicle interface controller/system manager 460 initiates a termination of the platoon.

The interface 420 also facilitates the transmission of certain state information—which is preferably ASIL validated state information—about both the host vehicle and the partner truck that is useful to the safety monitors. Specifically, the host vehicle state information 441 includes state information about the host vehicle that has been validated (e.g., ASIL-C validated) by the system manager 460 and is useful to one or more safety monitors on the partner vehicle. The partner vehicle state information 444 includes state information about the partner vehicle that has been validated by the partner vehicle's system manager and is useful for one or more safety monitors 465 on the host vehicle. Host vehicle state information 441 is transmitted to the platoon controller 410, which forwards such information without modification to the gateway 470, which in turn forwards the host vehicle state information to the gateway on the partner vehicle. Partner vehicle state information 444 received by gateway 470 from the partner vehicle's gateway is forwarded without modification to the platoon controller 410 and from there to system manager 460 (again without modification). Preferably the host state information 441 is transmitted with a checksum or other suitable data integrity verification mechanism that allows the receiving system manager to verify that the data it receives is uncorrupted. Any corrupted information can then be ignored. With this approach the ASIL validated state information is passed without modification from one ASIL compliant device (system manager 460 on a first platoon partner) to another (system manager 460 on a second platoon partner) and therefore is suitable for use in ASIL compliant safety checking algorithms—even when intermediate transmitting devices (e.g., platoon controller 410, gateway 470) are not themselves ASIL compliant.

The host and partner vehicle state information may include any ASIL validated state information that is used by any of the safety monitors. This may include, for example, vehicle wheel speeds, brake requests, torque requests and/or delivered torque, brake air supply pressure, steering position, accelerometer readings and/or any other information about the partner vehicle used by the system manager 460 as part of a safety monitor. To the extent that the platoon controller 410 utilizes partner state information originated by an ASIL validated device beyond the state information used by the system manager 460, that information can optionally be included in the vehicle state information 441, 444 as well—although such inclusion is not necessary and usually not desirable since such information can typically be obtained and sent by the partner vehicle's platoon controller, which reduces the bandwidth that needs to be allocated to the interface 420.

It is noted that some of the host vehicle's sensor information (e.g., wheel speed, brake pedal position, radar scenes, etc) is used by both the platoon controller 410 and the system manager 460. Since the platoon controller 410 is preferably an authorized listener on any appropriate vehicle control bus(es), the platoon controller does not need to wait to receive such information from the system manager. Rather, it obtains any relevant host vehicle sensor information directly from the appropriate sensor over any suitable connection such as an appropriate CAN bus. However any sensor information relevant to the system manager on the partner vehicle is read by the system manager (regardless of whether it is also read by the platoon controller) and included in host vehicle state information 441 so that the partner vehicle's system manager is ensured that such information is ASIL verified. In other embodiments any host vehicle sensor information that is not directly accessible by the platoon controller can be received via the system manager 460 acting as an intermediary.

Although there will be some overlap in the sensor information used, it should be appreciated that the host vehicle sensor information used by the host vehicle platoon controller 410 and the host vehicle system manager 460 will often vary and may further vary from the partner vehicle sensor information of interest. For example, the host platoon controller utilizes GNSS position data in the determination of the torque and braking requests, however the GNSS position information may not be utilized by the System Manager since it is not ASIL compliant.

Some of the sensor information that is used by the safety monitor on the host vehicle may not be needed by the safety monitor on the partner vehicle. This may include information such as the radar scenes, the accelerator pedal position, inputs from a host vehicle driver interface device 469, etc. To the extent that such sensor information is not used by the partner vehicle, there is no need for such information to be included in the vehicle state information 441, 444.

Some of a host vehicle's sensor information that is used by the platoon controller on the partner vehicle may not be ASIL compliant and therefore may not be used in the safety monitors on the partner vehicle. Such, sensor information that is not relevant to the safety monitors on the partner vehicle does not need to be included as part of vehicle state information 441, 444. Rather, such data may be obtained by the platoon controller 410 and sent to the corresponding platoon controller on the partner vehicle (by way of communication controllers 470). For example, it is extremely difficult to ASIL validate GPS or other GNSS position data. Therefore, GNSS position data is preferably not included in the vehicle state information 441, 444. Rather, such information is passed from the host vehicle's platoon controller to the partner vehicle's platoon controller via the gateways 470.

The driver interface device 469 may be a button or other suitable mechanism positioned at a convenient location on the host vehicle dashboard or elsewhere in the host vehicle cabin. The driver interface device 469 is a mechanism that the driver may press as appropriate to indicate that the driver is ready to platoon during initiation of a platoon, or to initiate the dissolution of a platoon when platooning is no longer desired. The use of the driver interface device 469 is described in more detail in U.S. patent application Ser. No. 15/607,902 which is incorporated herein by reference. In the illustrated embodiment, commands from the driver interface device 469 (which are preferably ASIL compliant) are sent to the vehicle interface controller 460 and passed from there to the platoon controller 410. Similarly, requests to the driver interface device pass from the platoon controller to the vehicle interface controller 460 and from the vehicle interface controller 460 to the driver interface device 469. This architecture simplifies the work that must be done to make the driver interface device 469 ASIL compliant. It should be appreciated, however, that in other embodiments, the platoon controller 410 may also be a direct listener to commands from the driver interface device. In the embodiment illustrated in FIG. 6, interface 420 includes driver platoon related requests and commands 427 which represent the request sent to and commands received from the driver interface device 469.

In some specific embodiments, the vehicle interface controller 460 is implemented as a single dedicated integrated circuit chip and the platoon controller 410 and gateway processor 470 are each implemented as separate system on modules (SOMs).

The platoon control system hardware architecture illustrated in FIG. 6 is particularly well suited for efficiently handling platooning control related tasks in an ASIL compliant manner using information available from a variety of sources including sources that are not themselves ASIL. With the described arrangement, the powertrain control commands ultimately issued by the control system may be ASIL rated.

The hardware architecture of FIG. 6 also has several advantages from a security standpoint. In the illustrated embodiment, the gateway processor 470 is not connected to any of the vehicle's control related communications buses (e.g., the CAN bus(es)). Therefore, the gateway processor 470, which is potentially the least secure of the three hardware components, is not able to transmit any information directly onto any of the more secure vehicle communications buses or receive any information directly from such buses—which is advantageous from a security standpoint since a nefarious entity cannot gain control the vehicle in any way by somehow hacking into the gateway processor 470. Furthermore, with this arrangement, the gateway processor 470 does not need to be ASIL compliant which greatly simplifies its certification.

Applications for Using Mass Estimations for Vehicles

Estimating the mass of a vehicle can have a number of applications.

In one application, the mass of a vehicle can be used to control the operation and system(s) on the vehicle itself (e.g., throttle, braking, steering, other actuators, etc.).

Vehicle mass estimations also have a number of applications in the context of platooning and related relative positioning of vehicles. Such applications may include organizing vehicles in general, arranging for vehicles to operate in a platoon using the relative estimated mass of each of the vehicles to select the lead and the following vehicles(s), scaling commands sent from the lead vehicle to the following vehicles(s) based on the relative mass of the vehicles operating in the platoon, and possibly using the mass estimation of a vehicle to control operations on the vehicle In addition, mass estimations, or sensor data used to calculate mass estimations, can be transmitted to a data processing center, such as a Network Operations Center (NOC), which may remotely coordinate the platooning of vehicles. For instance, by coordinating a platoon and communicating the mass of the two (or more) vehicles prior to engagement, the vehicles can immediately assume their proper platoon position (e.g., either the lead vehicle or following vehicle(s)) at their point of contact. It should be noted that the terms data processing center and NOC should each be widely construed to include a wide variety of implementations. In some embodiments, the data processing center and/or NOC may include one or more servers located at a single physical location. In other embodiments, the data processing center and/or NOC can be a distributed and include one or more servers located at different geographic locations, but interconnected over a network to share data and other communications.

Figure 8:
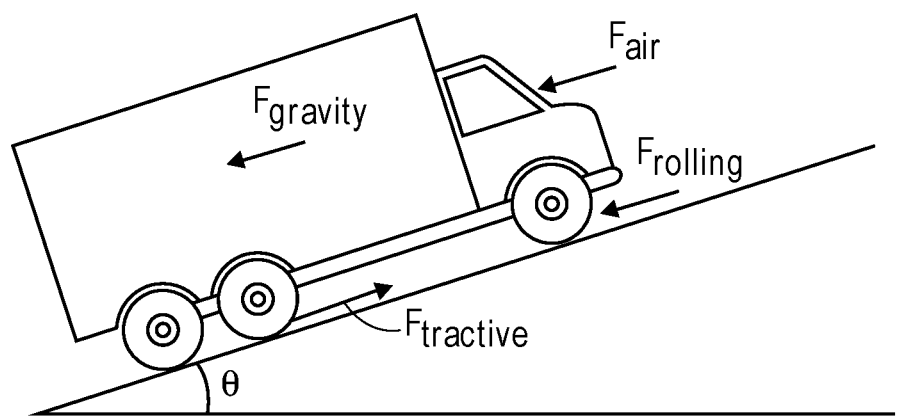
FIG. 8 is a diagram showing how mass estimation of a vehicle is modeled.

FIG. 8 is a diagram showing how mass estimation of a vehicle is typically modeled. In this example, the forces acting on the vehicle while in motion are measured or modeled, such as rolling resistance ($F_{rolling}$), air resistance ($F_{air}$), the forces of gravity ($F_{gravity}$), particularly if the vehicle is travelling either up or down hill, and any tractor forces ($F_{tractive}$) created by the vehicle pulling a tractor or other load. In addition, the acceleration of the vehicle is measured or modeled. Once the all the known forces are measured or modeled and the acceleration is modeled/known, mass is calculated using algorithms based on Newton's second law (Force=Mass×Acceleration).

Figure 9:
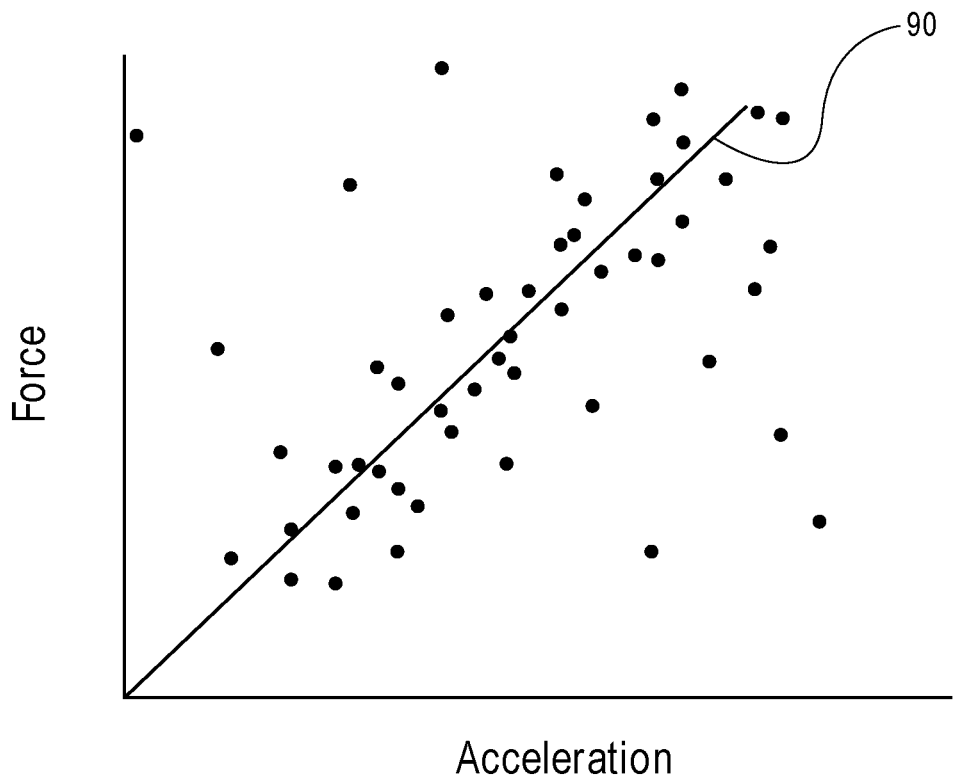
FIG. 9 is diagram illustrating how multiple mass estimation sample points are plotted and averaged over time to arrive at a mass estimation for a vehicle.

FIG. 9 is diagram illustrating how multiple mass estimation sample points are plotted over time to arrive at an accurate mass estimation for a vehicle. For example, a mass estimation calculation may be performed at fixed intervals of every 100 ms while the vehicle is operating. As the different mass estimations data points are collected, they are plotted based on Force vs. Acceleration. After a sufficient number of samples, the data points typically converge, as represented by the line 90 in the plot. Once this convergence takes place, a highly accurate estimation is realized, typically within five percent (5%) of the true mass of the vehicle.

The averaging of the mass estimation tends to result in a more accurate mass estimation in the presence in the presence of disturbances. For instance, a large tractor trailer may carry approximately 2000 lbs of fuel with full tanks. As this fuel is consumed, the mass will drift downward. By averaging over the duration of a trip, the mass estimation tracks changes in the mass due to fuel consumption.

Figure 10:
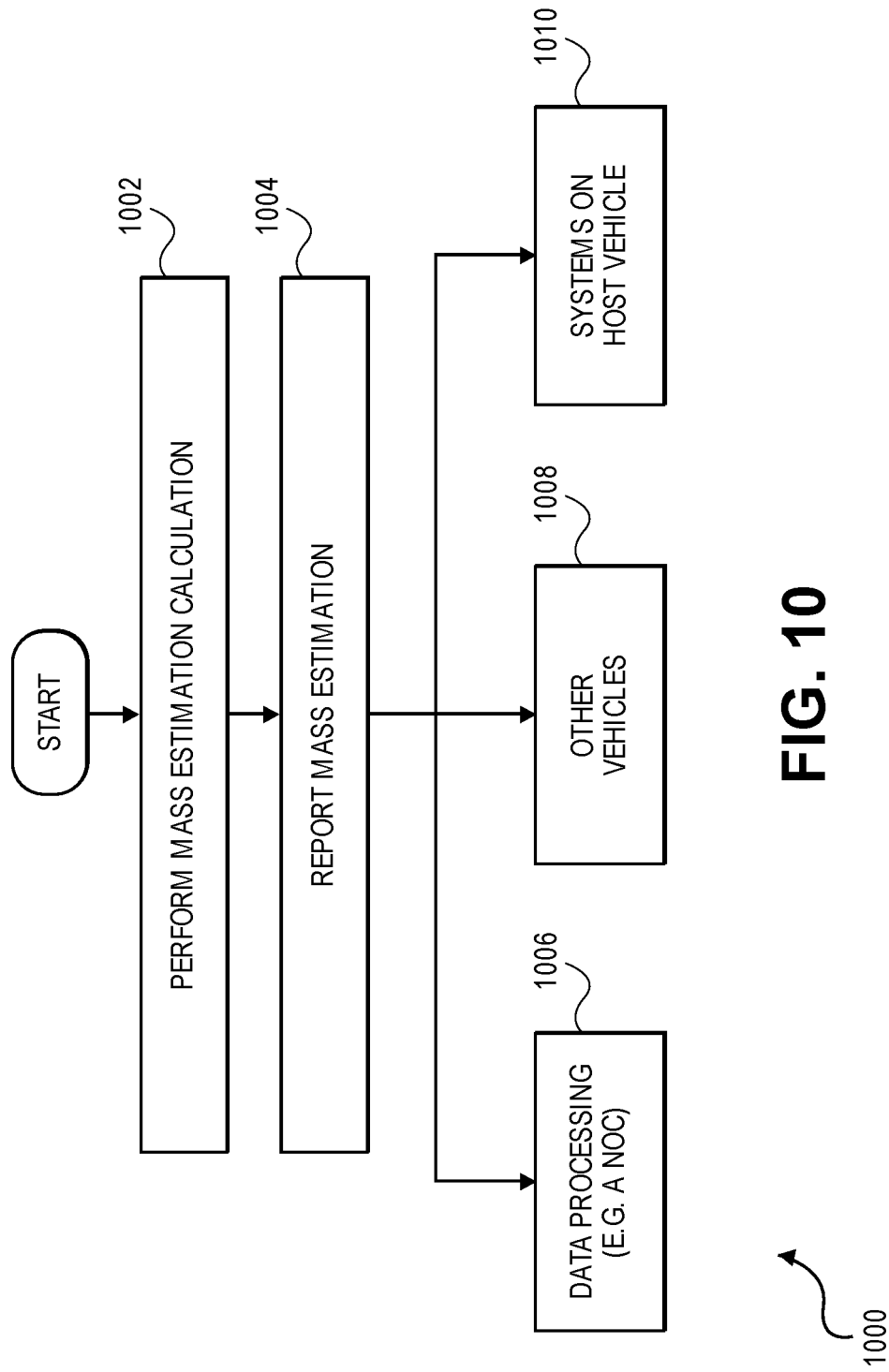
FIG. 10 is a diagram illustrating various possibilities for reporting a mass estimation of a vehicle in accordance to different non-exclusive embodiments of the present application

FIG. 10 is a diagram 1000 illustrating various possibilities for estimating, reporting and/or using vehicle mass estimations in accordance to different non-exclusive embodiments of the present application.

In non-exclusive embodiments, sensors, such as sensors 130 (i.e., 131 through 149) on tractor as illustrated in FIG. 1, generate sensor data used to define the various measures of forces and acceleration used to generate a mass estimation for a given vehicle. Such sensor data may include, but is not limited to for example, engine torque, the transmission gear ratio, wheel speed, retarder information, and/or GPS or other positioning and/or speed or acceleration information. In addition, the sensor data may also including braking events and braking magnitudes. However, as a general rule, sensor data collected during a braking event is not included in mass estimation samples. In general, braking events result in very large forces that are difficult to precisely model. As a result, small errors in the braking model, which are common, will typically introduce large errors in the modeled force, leading to large errors in the mass estimation calculation. Since it is difficult to model the braking forces to a level of precision that would improve the mass estimate (for example converting brake pressure to brake force or deceleration), data collected during breaking events is typically not used during braking events. In yet other embodiments, other data may be bundled with the sensor data. Such other data may include a vehicle ID, meta data, information contained in the vehicle configuration file 190. With a vehicle ID, the sensor data can be tagged to a particular vehicle. This feature is useful in situations where the mass estimation for a vehicle is calculated at a location remote from the host vehicle that generated the sensor data, such as a data processing center, such as a NOC, or on another vehicle.

The above represent a non-exhaustive list of sensor data that may be used for mass estimation calculations. It should be noted that other sensor data that may be considered may include data generated by actuator interfaces. For example, a sensor that measures the actual delivered torque by an engine, not just the engine torque command, may be used. In yet other embodiments, particularly with tractor-trailers, data generated by sensors that measure adjustable trailer axles, tire pressure, type and condition of the tires, the presence and/or position of any aerodynamic aids (fixed or adjustable), the configuration of a particular trailer or number of trailers, etc., may all be considered as well.

In step 1002, the mass estimation calculation for a vehicle is calculated and averaged over time, as discussed above. In one embodiment, the "raw" sensor data for a vehicle is wirelessly transmitted to a remote data processing center located on a network 1006, such as a NOC. The mass estimation is then calculated by the data processing center using the raw data. In an alternative embodiment, the mass estimation calculation is performed on the host vehicle that collects the sensor data. In yet another embodiment, the sensor data collected on a vehicle is transmitted to one or more other vehicles. In response, the one or more other vehicles calculate the mass estimation.

In step 1004, the calculated mass estimation may be shared with a number of different entities, depending on where the calculation was performed. For instance if a remote data processing center 1006, such as the NOC, performed the calculation, then the mass estimation may be reported to one or more other vehicles 1008 and/or the original or host vehicle 1010 that generated the sensor data. Similarly, if the calculation is performed by either the host vehicle 1010 or another vehicle (1008), then the calculation may optionally be reported to the center 1006, the one or more other vehicle 1008 and/or the host vehicle 1010.

The aforementioned embodiments provide just a few possibilities of where sensor data generated on host vehicles may be transmitted to, where mass estimation calculations may be performed, and the entities that receive the mass estimate calculations. It should be understood that these embodiments are merely illustrative and should be not be construed as limiting. In actual embodiments, a wide variety of sensor data may be transmitted to one or multiple locations, the mass estimation calculations for a vehicle may similarly be calculated at one or multiple locations and may be shared with multiple entities, including a NOC, a data processing center, other vehicles and/or the host vehicle. The mass estimate calculations for vehicles may also be used in a number of different ways, including but not limited to platooning.

Figure 11:
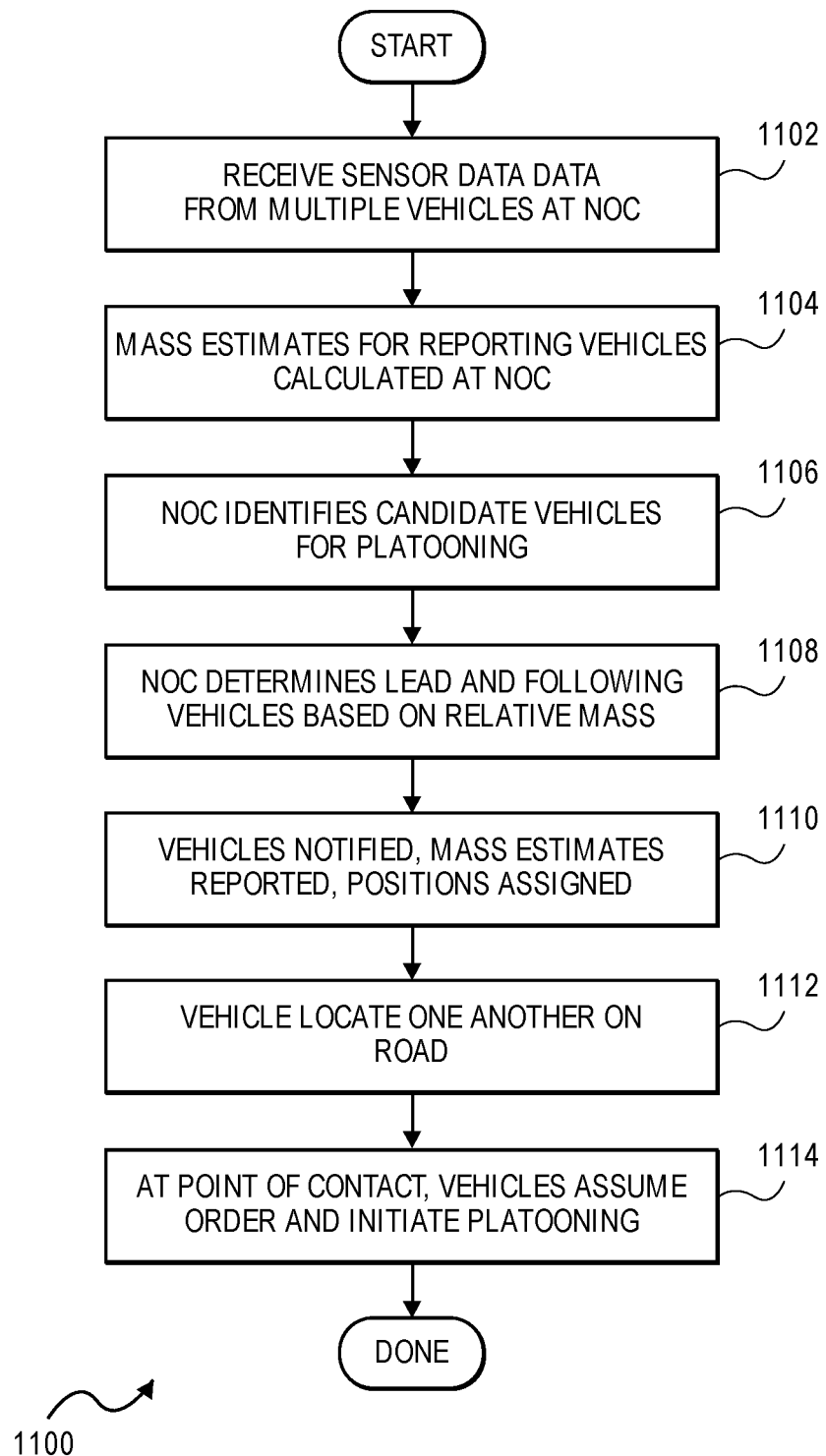
FIG. 11 is a flow diagram showing steps implemented by a Network Operations Center (NOC) using mass estimation data received from multiple vehicles for coordinating and arranging the order of the platooning vehicles.

FIG. 11 is a flow diagram 1100 showing steps for a Network Operations Center (NOC) using mass estimation data received from multiple vehicle to coordinate vehicle platooning.

In step 1102, sensor data is received at a NOC from a multiplicity of vehicles as they each travel from location to location. While driving, each vehicle transmits its sensor data, at periodic intervals, typically over a wireless network using one of a number of wireless protocols such as 3G, 4G, 5G, LTE, other cellular protocols known now or developed in the future. WiFi, (Google's Remote Procedure Call (GRPC) protocol or just about any other wireless communication protocol. For instance, a vehicle may sample and send sensor data every 100 milliseconds.

In step 1104, the NOC calculates the mass estimates for each reporting vehicle as the sensor data is received. The NOC thus maintains up-to-date mass estimation calculations for the multiple reporting vehicles as they drive from location to location.

In step 1106, the NOC identifies vehicles that are suitable for platooning. A number of variables may be consideration when determining if two (or more) vehicles should be paired and operate in a platoon. For instance, the type or class of the candidate vehicles, the vicinity of the candidate vehicles, the direction the candidate vehicles are travelling, and other factors. For instance two tractor trailers traveling in the same direction, along the same highway, and in the same general vicinity, would typically make an ideal pair for platooning. On the other hand, the same two tractor trailers traveling in opposite directions, on different highways, and many miles apart, are not good candidates for platooning.

In step 1108, once two or more vehicles for platooning are identified, the NOC determines the lead vehicle and following vehicles based on the relative mass estimations of each of the vehicles. As a general rule, the vehicle with the highest mass may be assigned the lead position. For the remainder of the vehicles, they are also ordered by mass behind the lead vehicle, from the largest to smallest in mass. Other ordering by mass may be chosen. For example in hilly terrain it may be more important to order by power to weight ratio as opposed to mass.

In step 1110, the NOC notifies the vehicles and recommends that they platoon. The mass estimates and positions of each of the vehicles is also reported to the vehicles joining the platoon.

In step 1112, the vehicles find one another on the road. With assistance from the NOC, the drivers of the two vehicles are directed to meet and engage in the platoon.

Finally, in step 1114, the vehicles assume their assigned position order and initiate platooning at the point of contact. When more than two vehicles are in the platoon, there is no requirement that all the vehicles converge and begin platooning at a single location. On the contrary, two vehicles can begin platooning at a first location and then other vehicle(s) can join at subsequent location(s). As the additional vehicles join, all the vehicles assume their assigned position in the platoon as dictated by the relative mass estimations, for example, with the vehicle with the largest mass leading to the vehicle with the smallest mass at the back of the platoon (or otherwise based in part or entirely on the vehicle mass).

There are a number of reasons assigning the highest mass vehicle the lead position in the platoon, including:

(1) As a general rule, the larger the mass of a vehicle, the more likely the vehicle will have diminished brake capabilities. For instance, larger mass vehicles have increased axle loading, experience more fade, require higher braking pressures and stress the braking system more compared to a lower mass vehicle. As a result, heavier mass vehicles typically have less predictable braking and will require a longer distance to slow down and/or come to a stop during a braking event. Therefore, by placing the largest mass vehicle in the lead position, the risk of the lead vehicle being rear-ended by a following vehicle during a breaking event is reduced.

(2) Larger mass vehicles, also as a general rule, have lower power-to-weight ratios, which makes them "slower". Again, in the context of platooning, it is typically beneficial to have a vehicle capable of quicker acceleration in a following position. While vehicles are platooning, it is often necessary for a following vehicle to accelerate, relative to the lead vehicle, to maintain a desired gap distance. If a "slower", higher mass vehicle is in a following position, it makes it more difficult for the following vehicle to speed up and maintain a desired gap.

While the largest mass vehicle is typically assigned the lead position in a platoon, it should be understood that this is by no means a requirement. There are a number of reasons why a larger mass vehicle may actually have better braking performance than a smaller mass vehicle. For instance, a smaller mass vehicle may have a poorly maintained braking system, worn tires capable of less grip, worn braking pads incapable of generating a high level of braking torque. For these and other reasons, it is possible for a heavier mass vehicle to actually have better braking performance than a lower mass vehicle. Also, a lower mass vehicle may not always accelerate quicker than a heavier mass vehicle. For instance with two tractor trailers, the power-to-weight ratio of a vehicle carrying a high mass payload may actually be greater than another vehicle carrying a smaller mass payload if the latter has a larger engine with more horsepower than the former. For at least these reasons, it may be preferred to place a smaller mass vehicle as the lead in a platoon. A NOC will therefore often consider a variety of factors in deciding if a platoon of two or more vehicles is appropriate, and if so, the proper order for organizing the vehicles in the platoon. Such factors may include, but are not limited to, the relative mass of the vehicles, the type or class of the vehicles, their relative braking capabilities, their relative power-to-weight ratios, their maintenance status, etc.

Once established, the relative mass estimations of the vehicles in the platoon is useful for scaling commands generated by the lead vehicle.

Figure 12:
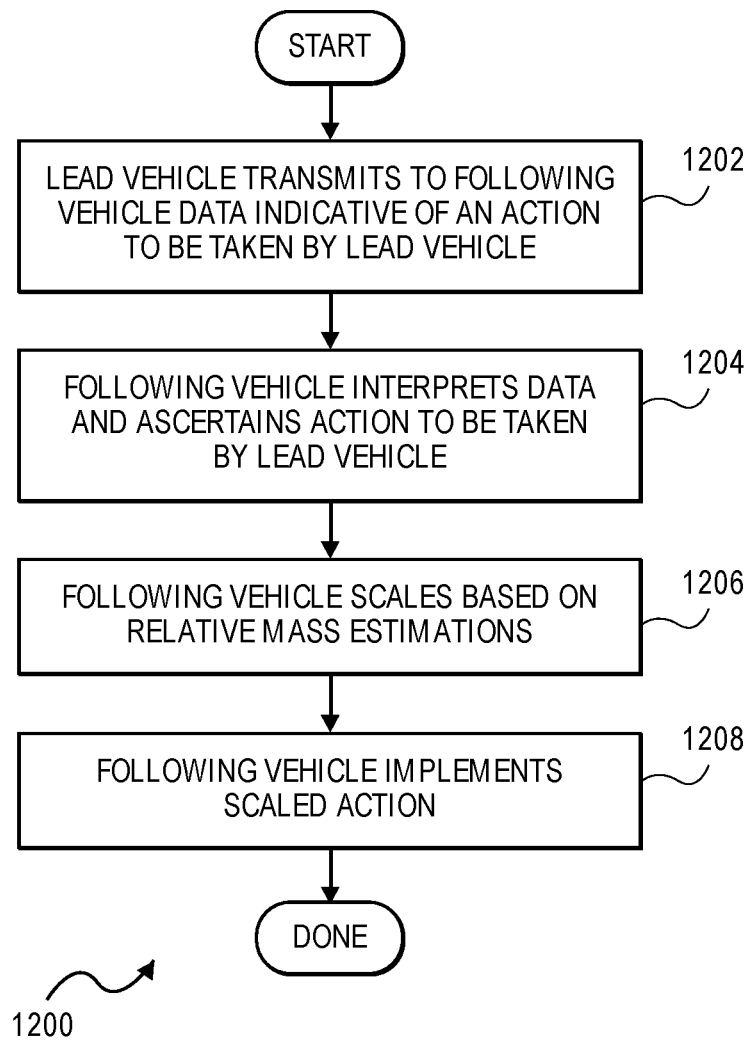
FIG. 12 is a flow diagram showing steps how a following vehicle scales action commands received from a lead vehicle in the platoon based on relative mass estimations between the two vehicles.

FIG. 12 is a flow diagram 1200 showing steps how a following vehicle scales action commands received from a lead vehicle in a platoon based on relative mass estimations between the two vehicles.

In step 1202, the lead vehicle generates and transmits an action command to be taken by the lead vehicle to the following vehicle(s), either in the form of an actuator signal or an acceleration, speed or position profile. For instance, the action can be either a throttle command or a braking command. In either case, the command will typically define a certain magnitude (i.e., an acceleration or a de-acceleration as measured in meters per second, an engine torque, a braking torque, brake pressure, etc).

In step 1204, the following vehicle(s) interpret the received command and ascertains the action to be taken by the lead vehicle.

In step 1206, the following vehicle determines a scaling factor for the command based on the relative mass estimation of the lead and following vehicles. In a non-exclusive embodiment, the scaling factor ("SF") is calculated from a product of a magnitude (M) of the command multiplied by a ratio defined by the mass estimation of the following vehicle ($ME_{following}$) divided by the mass estimation of the leading vehicle ($ME_{leading}$). In equation form, the SC is calculated by:

$$SF = M \times (ME_{following}/ME_{leading})$$

It should be understood that the SC is not necessarily strictly based on a ratio of the mass estimations of the two vehicles. A host of other factors may also be considered, such as the type of vehicles involved, the number of trailer(s) pulled by either vehicle if any, the maintenance records, tire pressure and/or condition of both vehicles, types of engines, braking systems and/or transmissions in each vehicle as well as driving and/or road conditions. For example if the vehicles are traveling down a large mountain pass as reported by a NOC, then the scaling of commands may be adjusted. Accordingly, it should be understood that the term scaling as used herein, should be widely construed to mean both a strict ratio of the estimated masses between vehicles as well as the ratio being adjusted for a wide variety of different considerations.

In step 1208, the following vehicle implements the scaled action using the calculated scaling factor. For instance, if a lead truck with a high mass issues a braking command of high pressure applied, then a smaller mass following vehicle can scale back the braking pressure application, knowing that it will take a lower braking pressure in the rear truck to achieve the same de-acceleration as the front truck. Similarly, with a throttle command, the rear vehicle will scale back its throttle response since it accelerates at a faster rate with the same torque application compared to the higher mass lead vehicle. In either case, gap control between the two vehicle is enhanced since the following vehicle can scale its accelerations and/or de-accelerations relative to the higher mass lead vehicle.

As an illustrative example, consider two trucks with the front truck at 80,000 lbs (such as a fully loaded 53 foot trailer behind a tractor) and the following truck at 40,000 lbs (such as near empty trailer plus tractor). While cruising, the front truck might be putting out 25% more torque to overcome rolling resistance (which is greater with greater mass) and wind resistance (which doesn't increase with added mass). During cruising the system in the rear truck may use this knowledge to determine a starting point for torque to apply (before closing the loop using control around gap), for example the front truck might be applying 1000 N-m and the rear truck is applying 800 N-m. When a hill begins, the front truck may need an additional 500 N-m. The rear truck can determine, for example, that based on the mass estimate, it needs only about an additional 250 N-m.

Figure 13:
FIG. 13 is a diagram illustrating how a vehicle may use an estimation of its mass to control operation and systems on the vehicle.

FIG. 13 is a diagram 1300 listing how a vehicle may use an estimation of its mass to control the operation of and systems on a vehicle. For instance, the mass estimation of a vehicle, regardless if calculated on the vehicle itself or received wirelessly from a data processing center such as a NOC, can be used to control or influence operations on the vehicle itself. Such operations may include path planning (e.g., braking or swerving/steering), vehicle control (e.g., determining a steering angle, a braking force for a given de-acceleration, or the magnitude of a torque demand) and/or the control of certain on-board actuators to implement the above (e.g., steering torque, brake pressure, throttle, etc.). One situation where a mass estimation of a vehicle may be beneficial is with path planning. The mass is important because it is one of the primary determining factors around what trajectories are feasible for the vehicles. For instance, consider a situation where a tractor-trailer encounters an obstacle on the road ahead, such as a stalled car. The preemptive action to take to avoid a collision may vary depending on the mass of the tractor trailer. If the trailer is loaded with heavy cargo (e.g. a high mass), then a sudden swerve may be dangerous, possibly causing the trailer to tip over or to not be successful in following the desired trajectory. Thus, the mass estimate is needed in these cases to determine what path the vehicle should attempt to follow. For example, under such a scenario, braking may be a preferred action rather than swerving. This determination can be communicated to the driver, or alternatively with autonomous or semi-autonomous vehicles, the braking action is implemented instead of steering.

Mass estimation may also be intelligently used for control of various systems and actuators on a vehicle.

With braking events for instance, the magnitude of a braking force, and consequently the amount brake pressure generated by braking actuators, can be scaled according to the mass of a vehicle. If a tractor-trailer wishes to brake at a rate of (−0.2 meters per second), then the amount of braking force and pressure generated by the braking system can scaled depending on the mass of the tractor-trailer. With high mass, the braking force and pressure are adjusted upward, whereas both can be scaled down with a low mass vehicle. This determination may also be based on other factors, such as the braking system hardware and software. For example a vehicle with larger brake chambers or more brake chambers may provide more deceleration from the same brake pressure.

Acceleration events can also be similarly scaled at least partially based on mass. More engine torque is typically required for a high mass compared to a low mass tractor trailer for a given acceleration (e.g., +0.3 meters per second). In addition to this simple scaling, the controller response may also be adjusted based on mass, to account for the difference in speed of response of the vehicle to the torque application. Steering actuation may also be based on mass. This can be critical in the steering position control loop (where the goal is a steering angle and the choice is how much steering torque to apply) or in the choice of a steering angle to meet a desired trajectory. For the former, the steering torque depends directly on weight on the axle, as well as on force created from the dynamics of the vehicle proportional to the vehicle mass. For the steering angle, the trajectory a vehicle will follow given a speed and steering angle, depends on the mass of the vehicle.

The examples provided above are merely illustrative and should not be construed as limiting. In actual embodiments, just about any system or actuator on a vehicle can be controlled, wholly or partially, based on the mass estimate of a vehicle. Such systems may include, but are not limited to, a fuel injection system, a knock control system, a suspension control system, an engine controller system, an autonomous or semi-autonomous driving control system, a cruise control system and/or an automatic transmission control system.

Figure 14:
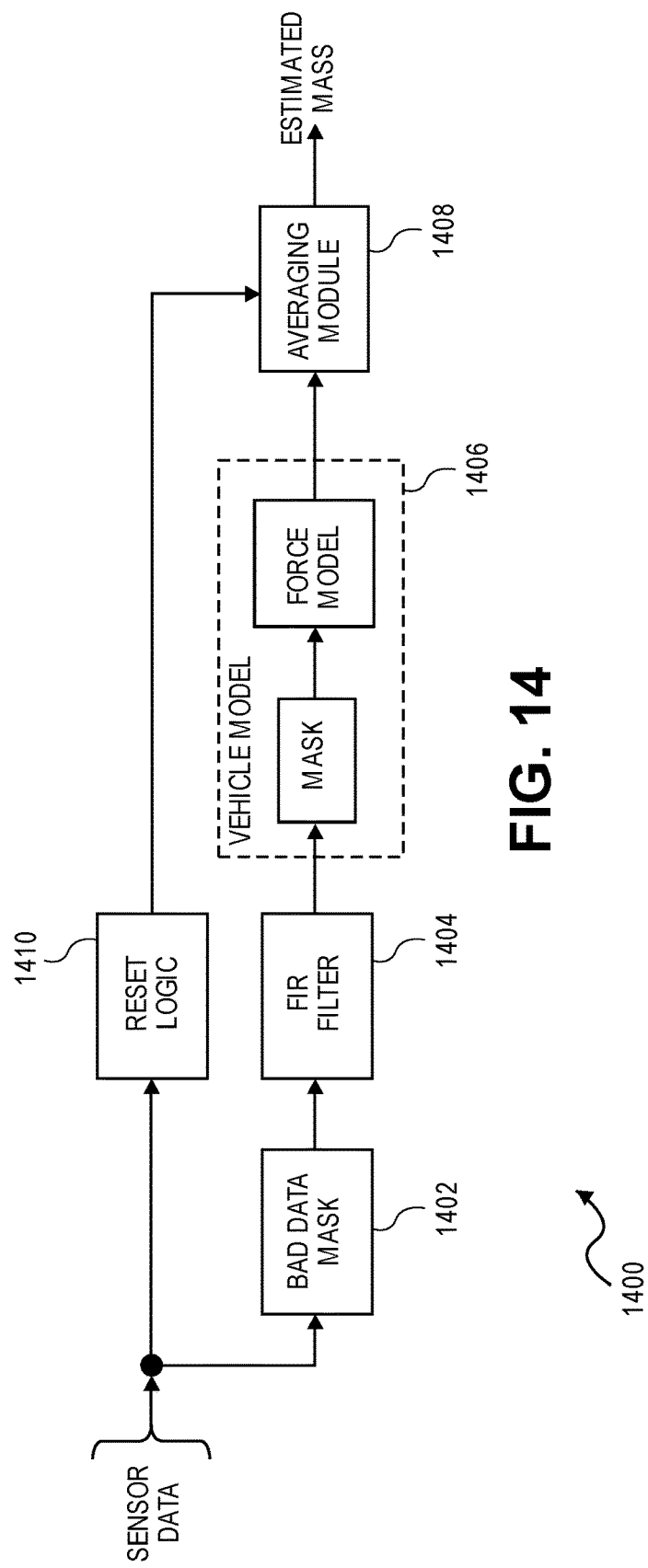
FIG. 14 illustrates a reset function used in cooperation with a data processing pipeline used for determining a mass estimation for a vehicle.

FIG. 14 is a diagram that illustrates a data processing pipeline 1400 used for determining a mass estimation for a vehicle with a reset function. As previously discussed, the mass of a vehicle is calculated by modeling the forces acting on the vehicle, measuring the acceleration of the vehicle, calculating for mass using Newton's second law, and then averaging a multitude of mass estimation samples over time.

In this non-exclusive embodiment, the data pipeline 1400 includes a bad data mask 1402, a Finite Impulse Response (FIR) filter 1404, a vehicle model module 1406 and an averaging module 1408.

As previously described, the pipeline 1400 receives the sensor data from a vehicle, which may include data indicative of engine torque, transmission gear ratios, GPS or positioning information, wheel speed and/or braking events.

The bad data mask 1402 acts to filter or remove data that is considered "bad" or inaccurate, meaning sensor data collected while the vehicle is traveling over a particularly bumpy/rough road, data collected while the vehicle is traveling at a very slow rate of speed (e.g., 9 mph or less) or GPS information collected while the vehicle is traveling under a bridge or through a tunnel, etc.

Once the bad data is removed, the remaining data is filtered by FIR filter 1404, which may apply in a non-exclusive embodiment, a 0.5 Hz Low-Pass cutoff frequency to the data. The advantage of applying the FIR filtering is that it removes phase lag from the sensed data and provides a well defined "wind up" time.

The filtered sensed data is then applied to the vehicle model module 1406. Within module 1406, certain sensor data is masked or rejected. For example, sense data collected during braking events and possibly a short time thereafter (e.g., 5 seconds) is removes since it is typically difficult to model braking forces. In addition, data collected during steady state engine torque and/or high gear ratios may also be masked since it is often difficult to model the forces acting on the vehicle in these states as well. Once certain data is masked, the module 1406 creates a force model for the given vehicle. In general, the force model relies a number of model parameters (e.g., wheel diameter, engine and retarder efficiency, engine inertia, an aerodynamic drag coefficient, etc.). From these parameters, the total force action on the vehicle ($F_{total}$) can be modeled using the following:

$$F_{total} = m \times a_{total}, \text{ where:} \quad (1)$$

$$F_{total} = F_{engine} - F_{aero\_drag} - F_{rolling\_resistance}; \text{ and} \quad (2)$$

$$a_{total} = a_{measured} + \text{gravity} \times \sin(\text{grade}) \quad (3)$$

By periodically sampling the sensed data and running it through the module 1406, a plurality of mass estimate (m) sample values are generated, which are then averaged by the averaging module 1408. For example, a large number of samples may be generated over a period of time and plotted. When the samples "converge", an accurate estimation of the mass of the vehicle is realized.

For more details on the pipeline 1400, see the above mentioned publications by Holm and Bae, Rye and Gerdes, both incorporated by reference herein.

It should be noted that the pipeline 1400 described above is merely exemplary and other mass estimation algorithms may be used, either currently known or developed in the future. With this in mind, the particular pipeline described and illustrated herein should not be construed as limiting in any manner.

Regardless of the mass estimation algorithm or data pipeline used, the Applicant is not aware of any example that relies on a reset function, such as that implemented by the reset module 1410 provided in the pipeline 1400. As detailed below, the reset module 1410 may be used to reset the pipeline and begin fresh mass estimations with fresh sensor data when certain reset conditions occur, as described in the two embodiments below.

In a non-exclusive embodiment, two mass estimation pipeline calculations are run in parallel. The first or primary is a "long horizon" mass estimation pipeline calculation, while the second or secondary is a "short horizon" mass estimation pipeline calculation.

The first or primary calculation is conducted indefinitely, provided the vehicle is operating and is in motion. The first or primary calculation is stopped only when the vehicle has stopped moving for more than a threshold period of time (e.g., 1, 5 minutes, etc.). If such a stop occurs, it is possible that the mass may change significantly after the vehicle resumes driving. For instance during a stop, a truck may deliver its cargo, or change trailers, both of which may result in a drastic change in mass. To take this possibility into account, the primary calculation discards the already collected sensor data and restarts the mass estimation calculation with fresh data collected after driving resumes.

On the other hand, the second or secondary mass estimation calculation operates only over short intervals of time (e.g., 2, 5 minutes, etc.). After the time interval expires, the previously collected sensor data is discarded and the second mass estimation calculation is reset using freshly sensed data, providing the vehicle is still operating and is driving. Since the second or secondary calculation is performed over a short time horizon, it typically (although not necessarily) will be less accurate and stable compared to the first or primary calculation, however, the secondary calculation will be indicative of how the mass may have changed from one time interval to the next. In various embodiments, the intervals are fixed, meaning the reset of the second mass estimation calculation occurs when each fixed interval expires. On alternative embodiments, the short intervals may vary or range between several reset time intervals.

Comparing the primary and the secondary mass estimations, running in parallel, provides a useful "sanity check". If the difference between the two is less than a threshold, such as 10% to 15%, it is a strong indicator that the mass of the vehicle has not drastically changed and the primary calculation is accurate. On the other hand if the threshold is exceeded, it sets a flag that the mass of the vehicle may have significantly changed. As a result, the mass estimation calculation is considered compromised and the first or primary pipeline 1400 is reset by the reset module 1410.

Figure 15:
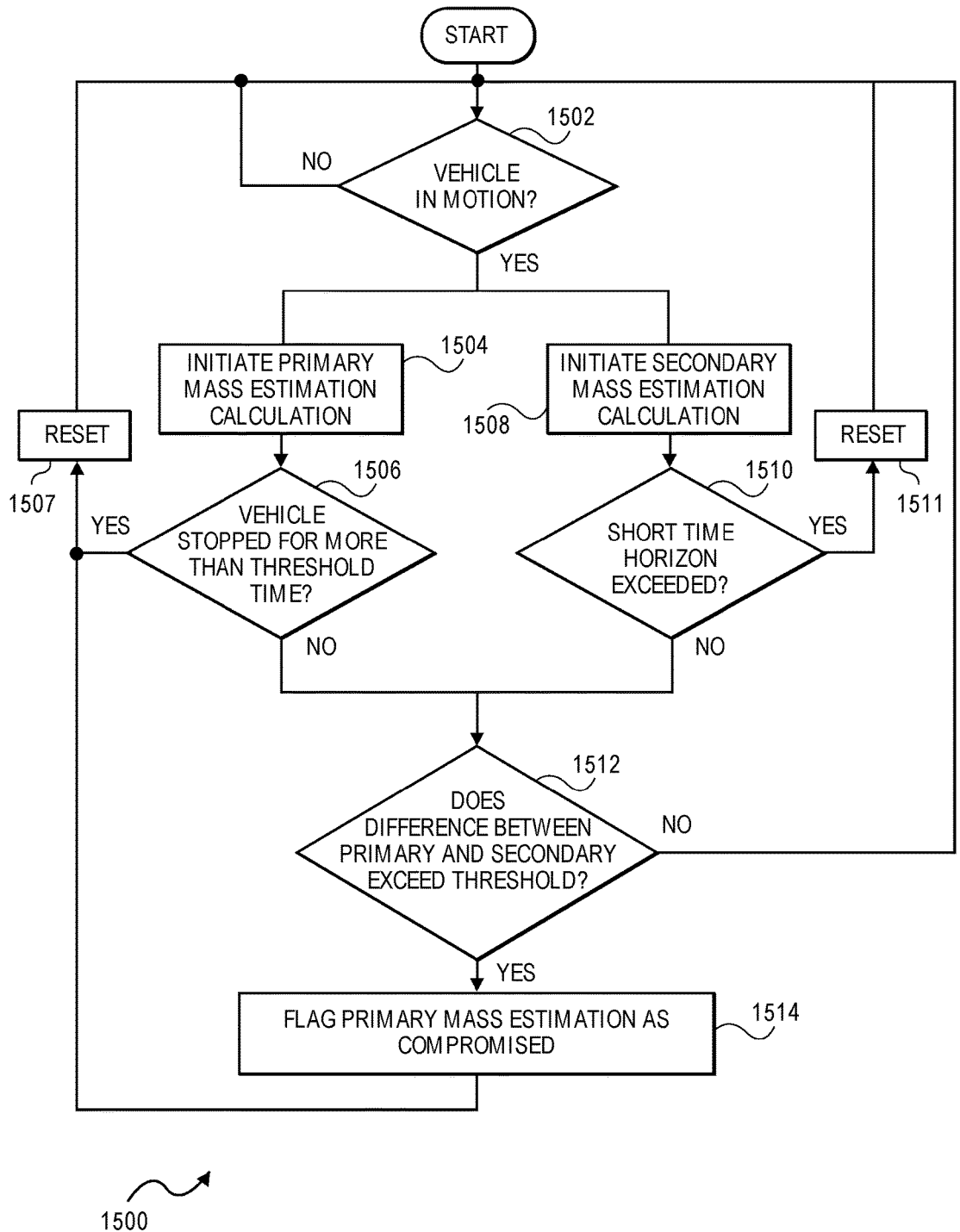
FIG. 15 is a flow chart of steps for executing a primary and a secondary mass estimation algorithm.

FIG. 15 illustrates a flow chart 1500 of steps for executing primary and secondary mass estimation calculations with the reset function 1408.

In the initial step 1502, it is determined if the vehicle is in motion.

When the vehicle is in motion, the primary and secondary mass estimations are initiated in parallel in steps 1504 and 1508 respectively.

In step 1506, the primary mass estimation calculation is performed indefinitely, provided the vehicle has not stopped for more than a threshold period of time.

The primary mass estimation calculation is reset by module 1410 in step 1507 if the vehicle comes to a stop for more than the threshold period of time.

When the vehicle resumes motion, as determined in step 1502, the primary mass estimation calculation will resume in step 1504.

In parallel, the secondary mass estimation calculation is performed in step 1508.

In decision 1510, it is determined if the short time horizon has expired. If yes, the reset module resets the secondary mass calculation in step 1511.

If the vehicle remains in motion following a reset, steps 1508, 1510 and 1511 are continually repeated As a result, the primary and secondary calculations are continually generating mass estimations while the vehicle is in motion.

In step 1512, the primary and secondary mass estimation calculations are continually compared. If the difference is less than the threshold (e.g., 10% to 15%), the above process is continually repeated.

On the other hand of the difference is larger than the threshold, then the primary mass estimation is flagged as compromised. If the designated threshold is exceeded, then it is assumed something has occurred to compromise the primary mass estimation. As a result, the primary mass estimation is reset in step 1507 and the process begins with fresh data.

If the vehicle is operating in a platoon, any number of actions may be taken when the mass estimation calculation is deemed compromised. For instance, the platoon can be dissolved or the gap can be widened as a safety precaution. If/when the primary and secondary mass estimations once again are within the threshold as determined in step 1512, then the platoon can be resumed and/or the gap reduced.

In yet other embodiments, the reset function implemented by module 1410 can be used in other settings that may not be suitable for platooning. Several examples are described below.

With tractor trailers, drastic mass changes can occur in a short period of time. For instance, a tractor may load or unload the cargo in its trailer or switch trailers in a short period of time. The trailer may be either significantly heavier or lighter after the change.

Certain vehicles, such as a gravel truck, may dump its cargo (e.g., gravel) out of the back while moving at a slow speed.

The mass of a vehicle may also drastically change, depending on its location. A cement truck will have its mass drastically increase at the concrete yard when picking up a new load of concrete, while the mass will significantly drop at a construction site when the concrete is poured.

In each of the above scenarios, the mass of the vehicle drastically changed. Using the result module 1410 in each of these instances, meaning based on time, speed or location, resets the mass estimate calculation using fresh sensor data, while discarding stale data that may no longer be accurate.

Figure 16:
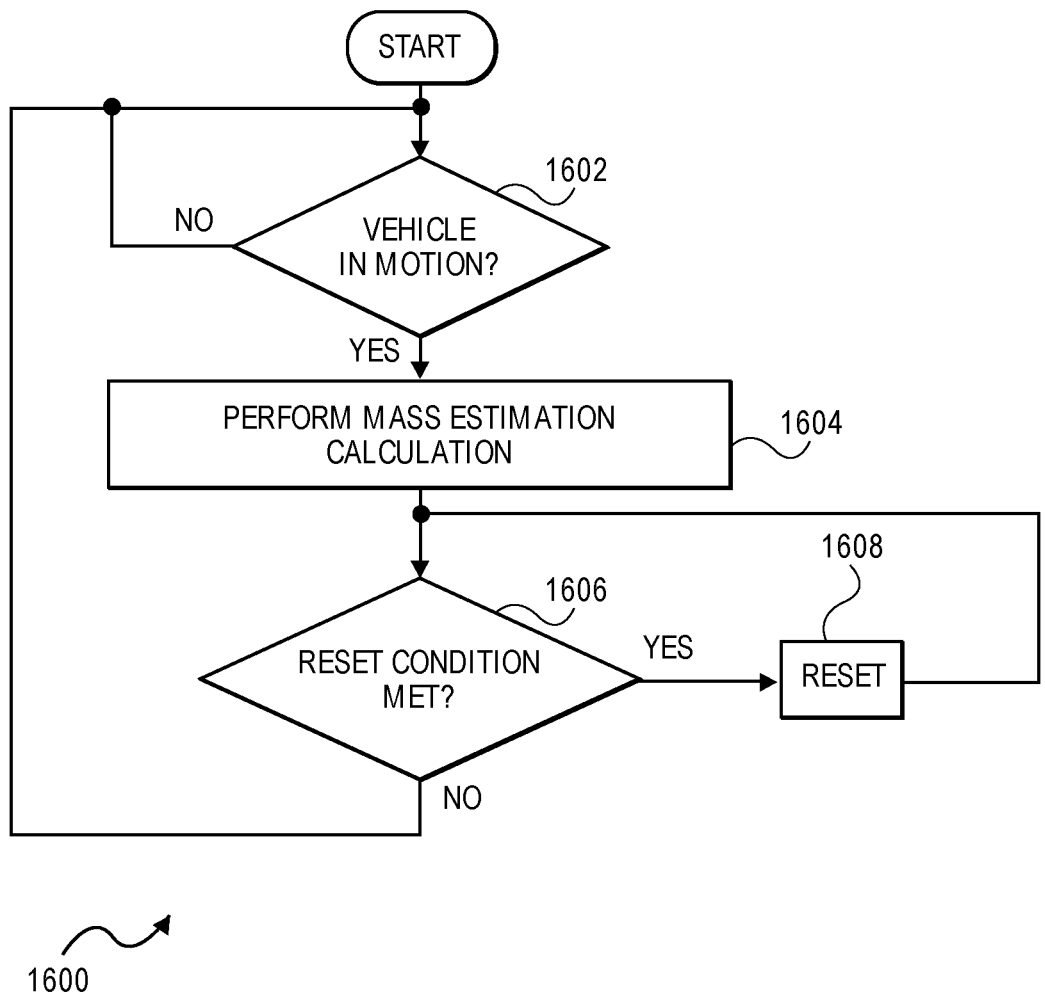
FIG. 16 is a flow diagram for resetting a mass estimation for a vehicle based on the vehicle stops, speed and/or location.

FIG. 16 illustrates a flow diagram 1600 for resetting a mass estimation for a vehicle optionally based on of vehicle stops, speed, location or any combination thereof.

In the initial step 1602, it is determined if the vehicle is in motion.

In step 1604, the mass estimation calculation is initiated when the vehicle is in motion.

In steps 1606 it is determined if a reset condition has been met or not. If not, the above process is repeated, provided the vehicle is in motion. If yes, the reset module 1410 resets the mass calculation estimation in step 1608.

When a reset occurs as provided in step 1608, the step of performing the mass estimation calculation is stopped until the reset condition is no longer met. When the reset condition is no longer present, the above-described process repeats starting at step 1602. The re-starting of the mass estimation calculation can be either a pause or a re-setting. In the case of the former, at least some of the existing data used for the calculation prior to the stop is used once the calculation resumes. On the other hand with a re-setting, all the prior data is discarded and the calculation begins anew with data collected after the stoppage.

As previously noted, the reset condition may be based on time, speed or location, or any combination thereof. For instance, in accordance with different embodiments, the reset may be implemented only when any one, two or all three conditions are met.

Therefore, the present embodiments should be considered illustrative and not restrictive and the invention is not to be limited to the details given herein, but may be modified within the scope and equivalents of the appended claims.

What is claimed is:

1. A method, comprising:
    identifying a first vehicle and a second vehicle at a data processing center;
    receiving at the data processing center sensor data from the first vehicle and the second vehicle, the sensor data useful for calculating a first mass estimation and a second mass estimation of the first vehicle and the second vehicle respectively;
    performing, at the data processing center, calculations for the first mass estimation for the first vehicle and the second mass estimation for the second vehicle using the sensor data received from the first vehicle and the second vehicle respectively;
    determining which of the first vehicle and the second vehicle are assigned a lead position and a following position in a platoon based on the first and the second mass estimations of the first vehicle and the second vehicle respectively; and
    coordinating the platoon between the first vehicle and the second vehicle by:
    directing the first vehicle and the second vehicle to rendezvous and engage in the platoon;
    communicating to and sharing among the first vehicle and the second vehicle the assigned lead the following positions in the platoon as determined from the calculated mass estimations of the first vehicle and the second vehicle respectively, the communication and sharing of the assigned lead and following positions enabling the two vehicles to each know their assigned position at a point of contact of the rendezvous,
    wherein the first vehicle and the second vehicle each assume their assigned position at the point of contact of the rendezvous.

2. The method of claim 1, wherein determining the assigned lead and the following positions for the first vehicle and the second vehicle further comprises:
    comparing the first and second mass estimations for the first vehicle and the second vehicle;
    determining the assigned lead position based on which of the first and the second vehicles has the larger mass estimation; and
    determining the assigned following position based on which of the first and the second vehicles has the smaller mass estimation.

3. The method of claim 1, further comprising sharing the first mass estimation of the first vehicle with the second vehicle.

4. The method of claim 3, further comprising:
    generating commands at the first vehicle while the first and second vehicles are operating in the platoon;
    sharing the commands generated at the first vehicle with the second vehicle;
    scaling the commands at the second vehicle when received from the first vehicle, the scaling of the commands based at least partially on a relative difference between the first and second mass estimations of the two vehicles; and
    performing the scaled commands at the second vehicle.

5. The method of claim 4, wherein the commands include braking commands and throttle commands.

6. The method of claim 1, wherein the sensor data received at the data processing center includes data collected from or indicative of one or more of the following:
    an engine torque command;
    actual delivered engine torque;
    transmission gear ratios;
    GPS or positioning information;
    wheel speed;
    braking events
    tire pressure;
    tire condition;
    presence or position of aerodynamic aids;
    configuration of a trailers;
    a number of trailers; and/or
    one or more trailer axles.

7. The method of claim 1, wherein receiving the sensor data at the data processing center further comprises receiving the sensor data from the first vehicle and the second vehicle over a wireless communication network.

8. The method of claim 1, wherein coordinating the platoon further comprises communicating with the first vehicle and the second vehicle over a wireless communication network.

9. The method of claim 1, further comprising:
    receiving at the data processing center the sensor data from a multiplicity of vehicles; and
    coordinating a plurality of platoons among the multiplicity of vehicles.

10. The method of claim 1, wherein the platoon includes one or more additional vehicles in addition to the first vehicle and the second vehicle, the vehicles arranged in the platoon in a front-to-back sequence from a highest mass estimation to a lowest mass estimation respectively.

11. The method of claim 1, wherein the data processing center is a Network Operations Center (NOC) arranged to remotely coordinate platooning between a multiplicity of tractor-trailers, the multiplicity of tractor-trailers each reporting their sensor data to the NOC so that the NOC can selectively coordinate platoons among the multiplicity of tractor-trailers.

12. The method of claim 1, wherein the first and the second vehicles are both tractor-trailer trucks.

13. The method of claim 1, further comprising:
    (a) periodically updating the mass estimation calculation for the first vehicle from sensor data sensed on the first vehicle as the first vehicle is driving;
    (b) detecting a braking event by the first vehicle; and
    (c) interrupting the periodic updating of the mass estimation calculation of the first vehicle during the detected braking event, the interrupting resulting in an exclusion of the sensor data sensed during the braking event from being used in the periodic updating of the mass estimation calculation of the first vehicle.

14. The method of claim 13, further comprising repeatedly performing steps (a), (b) and (c) while the first vehicle is driving so that the mass estimation calculation of the first vehicle is repeatedly updated while excluding sensor data sensed during braking events.

15. A method, comprising:
    generating sensor data for a first vehicle, the sensor data usable for estimating a first mass of the first vehicle;

calculating a mass estimation for the first vehicle based on the generated sensor data;

sharing the calculated mass estimation for the first vehicle with one or more additional vehicle(s); and coordinating a platoon between the first vehicle and the one or more additional vehicles, an assigned position of the first vehicle in the platoon relative to the one or more additional vehicles in the platoon at least partially determined by the mass estimation of the first vehicle, the coordinating of the platoon involving:

directing the first vehicle and the one or more additional vehicles to rendezvous and engage in the platoon; and the first vehicle assuming the assigned position in the platoon relative to the one or more additional vehicles after rendezvousing with the one or more additional vehicles.

16. The method of claim 15, wherein calculating the mass estimation for the first vehicle is performed on the first vehicle.

17. The method of claim 15, wherein calculating the mass estimation for the first vehicle occurs at the one or more additional vehicle(s).

18. The method of claim 15, wherein calculating the mass estimation for the first vehicle occurs at a Network Operations Center (NOC).

19. The method of claim 15, wherein the sensor data for the first vehicle includes data collected from or indicative of one or more of the following:
(a) engine torque;
(b) transmission gear ratios;
(c) GPS or positioning information;
(d) wheel speed;
(e) braking events;
(f) actual delivered engine torque;
(g) tire pressure;
(h) tire condition;
(i) presence or position of aerodynamic aids;
(j) configuration of any trailers;
(k) a number of trailers; and/or
(l) one or more trailer axles.

20. The method of claim 15, wherein the sensor data used for calculating the mass estimation for the first vehicle includes data collected from or indicative of one or more of the following:
(a) engine torque;
(b) transmission gear ratios;
(c) GPS or positioning information; and/or
(d) wheel speed;
(e) actual delivered engine torque;
(f) tire pressure;
(g) tire condition;
(h) presence or position of aerodynamic aids;
(i) configuration of any trailers;
(j) a number of trailers; and/or
(k) one or more trailer axles.

21. The method of claim 15, further comprising
sharing the calculated mass estimation for the first vehicle with a second vehicle; and
sharing a second mass calculation estimation for the second vehicle with the first vehicle.

22. The method of claim 15, wherein sharing the calculated mass estimation for the first vehicle with the one or more additional vehicle(s) further comprises wirelessly transmitting the calculated mass estimation for the first vehicle to the one or more additional vehicle(s).

23. The method of claim 15, wherein sharing the calculated mass estimation for the first vehicle with the one or more additional vehicle(s) further comprises:
wirelessly transmitting the sensed data for the first vehicle to a data processing center;
performing the calculation of the mass estimation for the first vehicle at the data processing center; and
wirelessly transmitting the calculated mass estimation from the data processing center to the one or more additional vehicle(s).

24. The method of claim 15, further comprising using the calculated mass estimation of the first vehicle to determine a velocity of the first vehicle relative to the one or more additional vehicle(s) while platooning.

25. The method of claim 15, further comprising arranging for the first vehicle and the one or more additional vehicle(s) to operate in the platoon with the vehicle with the highest mass estimation in a lead position and the remaining vehicle(s) following in order from highest to lowest mass estimation(s) respectively.

26. The method of claim 15, further comprising:
scaling at the one or more other vehicles commands generated by the first vehicle and shared with the one or more other vehicles while operating in the platoon, the scaling of the commands based at least partially on the calculated mass estimation of the first vehicle.

27. The method of claim 26, wherein the first vehicle and the one or more other vehicles are organized into the platoon with the first vehicle leading the platoon and the one or more other vehicles following in the platoon.

28. The method of claim 26, wherein the commands are either:
(a) braking commands;
(b) torque commands; or
(c) both braking and torque commands.

29. The method of claim 15, wherein rendezvousing with the one or more additional vehicles occurs at one or more locations.

* * * * *